United States Patent
Guo et al.

(10) Patent No.: US 11,451,976 B2
(45) Date of Patent: *Sep. 20, 2022

(54) METHOD AND APPARATUS FOR PERFORMING UE BEAMFORMING IN A WIRELESS COMMUNICATION SYSTEM

(71) Applicant: ASUSTek Computer Inc., Taipei (TW)

(72) Inventors: Yu-Hsuan Guo, Taipei (TW); Meng-Hui Ou, Taipei (TW)

(73) Assignee: ASUSTek Computer Inc.

( * ) Notice: Subject to any disclaimer, the term of this patent is extended or adjusted under 35 U.S.C. 154(b) by 58 days.

This patent is subject to a terminal disclaimer.

(21) Appl. No.: 17/074,943

(22) Filed: Oct. 20, 2020

(65) Prior Publication Data
US 2021/0037397 A1  Feb. 4, 2021

Related U.S. Application Data

(63) Continuation of application No. 15/631,232, filed on Jun. 23, 2017, now Pat. No. 10,855,342.

(60) Provisional application No. 62/354,301, filed on Jun. 24, 2016.

(51) Int. Cl.
| | |
|---|---|
| H04B 7/204 | (2006.01) |
| H04W 16/28 | (2009.01) |
| H04W 72/04 | (2009.01) |
| H04L 5/00 | (2006.01) |
| H04W 76/18 | (2018.01) |
| H04W 56/00 | (2009.01) |

(52) U.S. Cl.
CPC ........... *H04W 16/28* (2013.01); *H04L 5/0051* (2013.01); *H04W 56/001* (2013.01); *H04W 72/042* (2013.01); *H04W 72/046* (2013.01); *H04W 76/18* (2018.02)

(58) Field of Classification Search
CPC . H04W 16/28; H04W 56/001; H04W 72/042; H04W 72/046; H04W 76/18; H04W 76/19; H04L 5/0051; H04L 5/0048; H04L 5/0053; H04L 5/0023; H04B 7/0408; H04B 7/0695; H04B 7/088; H04B 7/0404
See application file for complete search history.

(56) References Cited

U.S. PATENT DOCUMENTS

| | | | | |
|---|---|---|---|---|
| 2010/0273499 | A1* | 10/2010 | van Rensburg ... | H04W 72/1231 455/450 |
| 2016/0099763 | A1* | 4/2016 | Chen ..................... | H04B 7/063 370/329 |
| 2016/0353510 | A1* | 12/2016 | Zhang ................... | H04W 16/28 |
| 2017/0207843 | A1* | 7/2017 | Jung ....................... | H04B 7/063 |

(Continued)

FOREIGN PATENT DOCUMENTS

WO   WO-2017151116 A1 *  9/2017   ........... H04B 7/0695

*Primary Examiner* — Atique Ahmed
(74) *Attorney, Agent, or Firm* — Cooper Legal Group LLC

(57) ABSTRACT

A method for a wireless communications system is disclosed. In one example, a user equipment (UE) (e.g. a mobile phone), receives an indication from a network about one or more UE beams that the UE can use for transmission or reception. The UE uses the one or more UE beams for transmission or reception. If and when a certain condition is fulfilled, for example, there is a beam tracking failure, the UE transmits or receives a specific signal via a specific UE beam. The specific UE beam is different from the one or more UE beams that were indicated by the network, and is selected by the UE.

18 Claims, 24 Drawing Sheets

(56) References Cited

U.S. PATENT DOCUMENTS

2017/0231011 A1* 8/2017 Park ................ H04W 74/0841
2017/0302355 A1* 10/2017 Islam ................ H04L 5/0051
2017/0359826 A1* 12/2017 Islam ................ H04W 72/14

* cited by examiner

Different deployment scenarios with Single TRP cell

Different deployment scenarios with multiple TRPs Cell

METHOD AND APPARATUS FOR PERFORMING UE BEAMFORMING IN A WIRELESS COMMUNICATION SYSTEM

CROSS-REFERENCE TO RELATED APPLICATIONS

This application claims priority to and is a continuation of U.S. application Ser. No. 15/631,232, filed on Jun. 23, 2017 and entitled "METHOD AND APPARATUS FOR PERFORMING UE BEAMFORMING IN A WIRELESS COMMUNICATION SYSTEM", which claims priority to U.S. Provisional Patent Application Ser. No. 62/354,301, filed on Jun. 24, 2016 and entitled "METHOD AND APPARATUS FOR PERFORMING UE BEAMFORMING IN A WIRELESS COMMUNICATION SYSTEM". The entirety of U.S. application Ser. No. 15/631,232 and U.S. Provisional Patent Application Ser. No. 62/354,301 are expressly incorporated herein by reference

TECHNICAL FIELD

The subject disclosure is directed to wireless communications, and is more particularly related to beamforming by a user equipment (UE) (e.g. a mobile phone) operating in a cell (e.g. a 5G cell).

BACKGROUND

The 3rd Generation Partnership Project (3GPP) is a group that is trying to investigate and develop technology components for the next generation access technology, namely 5G. 3GPP commenced its standardization activities vis-a-vis the 5G in March of 2015. 3GPP regularly publishes its meeting notes that describe its proposals, reference architecture models and study items for 5G. For example, 3GPP envisions a single cell architecture that contains multiple TRPs (also referred to as distributed units (DUs)) and supports intra-cell mobility of the UE as it travels among the TRPs. This architecture presents numerous challenges to which the inventions disclosed herein provide solutions.

SUMMARY

The following presents a simplified summary of the specification to provide a basic understanding of some aspects of the specification. This summary is not an extensive overview of the specification. It is intended to neither identify key or critical elements of the specification nor delineate any scope particular to any embodiments of the specification, or any scope of the claims. Its sole purpose is to present some concepts of the specification in a simplified form as a prelude to the more detailed description that is presented later.

As used herein, the following terms can be referred to by the respective abbreviations: 3rd Generation Partnership Project (3GPP); 5th generation (5G); Beam Specific Reference Signal (BRS); Base Station (BS); Cloud RAN (C-RAN); Connected State (CONN); Channel State Information (CSI); Closed Subscriber Group (CSG); Central Unit (CU); Downlink (DL); Distributed Unit (DU); Evolved Node B (eNB or eNodeB); Evolved Universal Terrestrial Radio Access (E-UTRA); Frequency-Division Duplex (FDD); Global System for Mobile Communications (GSM); Hybrid Automatic Repeat Request (HARQ); Long Term Evolution (LTE); Medium Access Control (MAC); Multiple Input, Multiple Output (MIMO); Network Function Virtualization (NFV); New RAT (NR); Network (NW); Physical (PHY); Public Land Mobile Network (PLMN); Radio Access Technology (RAT); Radio Frequency (RF); Radio Resource Control (RRC); Reference Signal Receiving Power (RSRP); Reference Signal Receiving Quality (RSRQ); Reception (Rx); Signal to Interference Plus Noise Ratio (SINR); Tracking Area (TA); Tracking Area Code (TAC); Tracking Area Identity (TAI); Transmission Reception Point (TRP); TRP Group (TRPG); Technical Specification (TS); Transmission (Tx); User Equipment (UE) (also referred to as UE device); and Universal Terrestrial Radio Access (UTRA).

In various non-limiting embodiments, by way of example, the disclosed subject matter provides a method for a user equipment (UE), in which the UE receives an indication from a network about one or more UE beams to be used for transmission or reception. The UE uses the one or more UE beams for transmission or reception. If a certain condition is fulfilled, the UE transmits or receives a specific signal using a specific UE beam. The specific UE beam is selected by the UE and is different from the one or more UE beams.

In a further non-limiting example, the specific signal includes feedback about measurement information related to a UE beam change, a serving beam change or a serving TRP change.

In a further non-limiting example, the specific signal includes an indication about a UE beam change, a serving beam change or a serving TRP change.

In a further non-limiting example, the specific signal includes a scheduling request.

In a further non-limiting example, the condition comprises change of all the one or more UE beams, a UE beam misalignment, a serving beam misalignment, a beam tracking failure, or a non-alignment of uplink timing.

In a further non-limiting example, selecting the specific UE beam includes successfully receiving a common signal from the specific UE beam. In a further non-limiting example, the common signal could be a synchronization signal or a reference signal.

In addition, further example implementations are directed to systems, devices and/or other articles of manufacture that facilitate robust transmission or reception of signaling.

These and other features of the disclosed subject matter are described in more detail below.

BRIEF DESCRIPTION OF THE DRAWINGS

The devices, components, systems, and methods of the disclosed subject matter are further described with reference to the accompanying drawings in which.

DETAILED DESCRIPTION

The 5G technology aims to support the following three families of usage scenarios, and specifically to satisfy both urgent market needs and more long-term requirements set forth by the ITU-R IMT-2020: (i) eMBB (enhanced Mobile Broadband), (ii) mMTC (massive Machine Type Communications) and (iii) URLLC (Ultra-Reliable and Low Latency Communications). An objective of 3GPP's 5G study item on new radio access technology is to identify and develop technology components for new radio systems that can operate in any spectrum band ranging from low frequencies to at least 100 GHz. However, radio systems that try to support high carrier frequencies (e.g. up to 100 GHz) will encounter a number of challenges in the area of radio propagation. For example, with increasing carrier frequency, the path loss would also increase.

According to R2-162366 (3GPP TSG-RAN WG2 Meeting #93bis), in lower frequency bands (e.g. in current Long Term Evolution (LTE) bands <6 GHz), the required cell coverage is provided by forming a wide sector beam for transmitting downlink common channels. However, utilizing wide sector beam on higher frequencies (>>6 GHz) is problematic in that the cell coverage is reduced for the same antenna gain. Thus, in order to provide the required cell coverage on higher frequency bands, higher antenna gain is needed to compensate for the increased path loss. To increase the antenna gain over a wide sector beam, larger antenna arrays, where the number of antenna elements range from tens to hundreds, are used to form high gain beams. As a consequence, the high gain beams are formed narrower than a typical wide sector beam, and so multiple high gain beams are needed for transmitting downlink common channels to cover the required cell area. The number of concurrent high gain beams that an access point is able to form is limited by the cost and complexity of the utilized transceiver architecture. In practice, for higher frequencies, the number of concurrent high gain beams is much less than the total number of beams required to cover the cell area. In other words, the access point is able to cover only a portion of the cell area by using a subset of beams at any given time.

Figure 1:
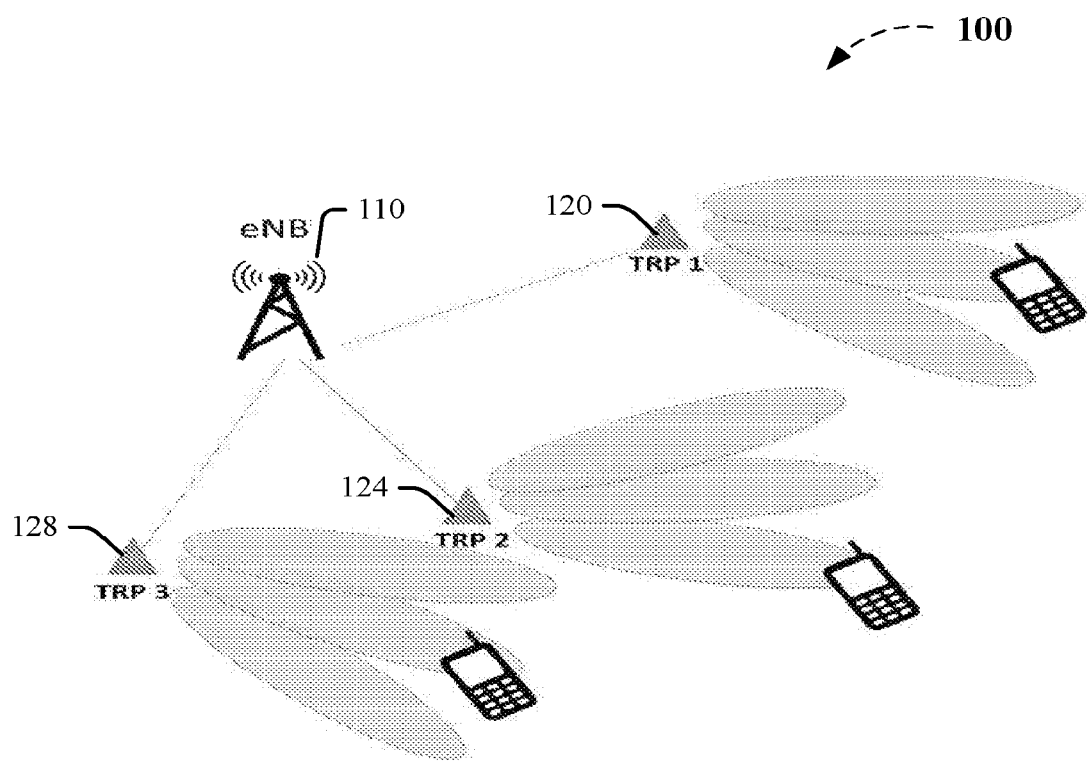
FIG. 1 illustrates the beam concept in 5G, where each TRP is generating multiple narrow beams, for example, as part of beam sweeping.

According to R2-163716 (3GPP TSG-RAN WG2 Meeting #94), beamforming is a signal processing technique used in antenna arrays for directional signal transmission/reception. In beamforming, a beam is be formed by combining elements in a phased array of antennas in such a way that signals at particular angles experience constructive interference while others experience destructive interference. Different beams are formed simultaneously using multiple arrays of antennas. According to R2-162709 (3GPP TSG RAN WG2 Meeting #93bis) and as shown in FIG. 1, the 5G cell 100 includes an evolved Node B (eNB) 110 communicably coupled to multiple transmission/reception points (TRPs) 120, 124 and 128, which can be either centralized or distributed. Each TRP 120, 124 or 128 can and is shown to form multiple beams. The number of beams formed by the TRP 120, 124 or 128 and the number of simultaneous beams in the time/frequency domain depend on the number of antenna array elements and the radio frequency RF being utilized by the TRP 120, 124 or 128.

Potential mobility types for the new radio access technology (NR) include intra-TRP mobility, inter-TRP mobility and inter-NR eNB mobility. According to R2-162762 (TSG RAN WG2 Meeting #93bis), the reliability of a system purely relying on beamforming and operating at higher frequencies is subject to challenges. A reason being that the coverage of such a system is more sensitive to both time and space variations. As a consequence, the signal to interference plus noise ratio (SINR) of its link (which is narrower than LTE) can drop much quicker than in the case of LTE.

In the 5G systems, fairly regular grid-of-beams coverage patterns with tens or hundreds of candidates for serving beams per node can be created, by using antenna arrays having hundreds of elements at access nodes. However, the coverage area of an individual serving beam from such an array would be small, down to the order of some tens of meters in width. As a consequence, channel quality degradation outside a currently-in-use serving beam's area would happen quicker than in the case of wide area coverage (e.g. as provided by LTE).

Figure 2:
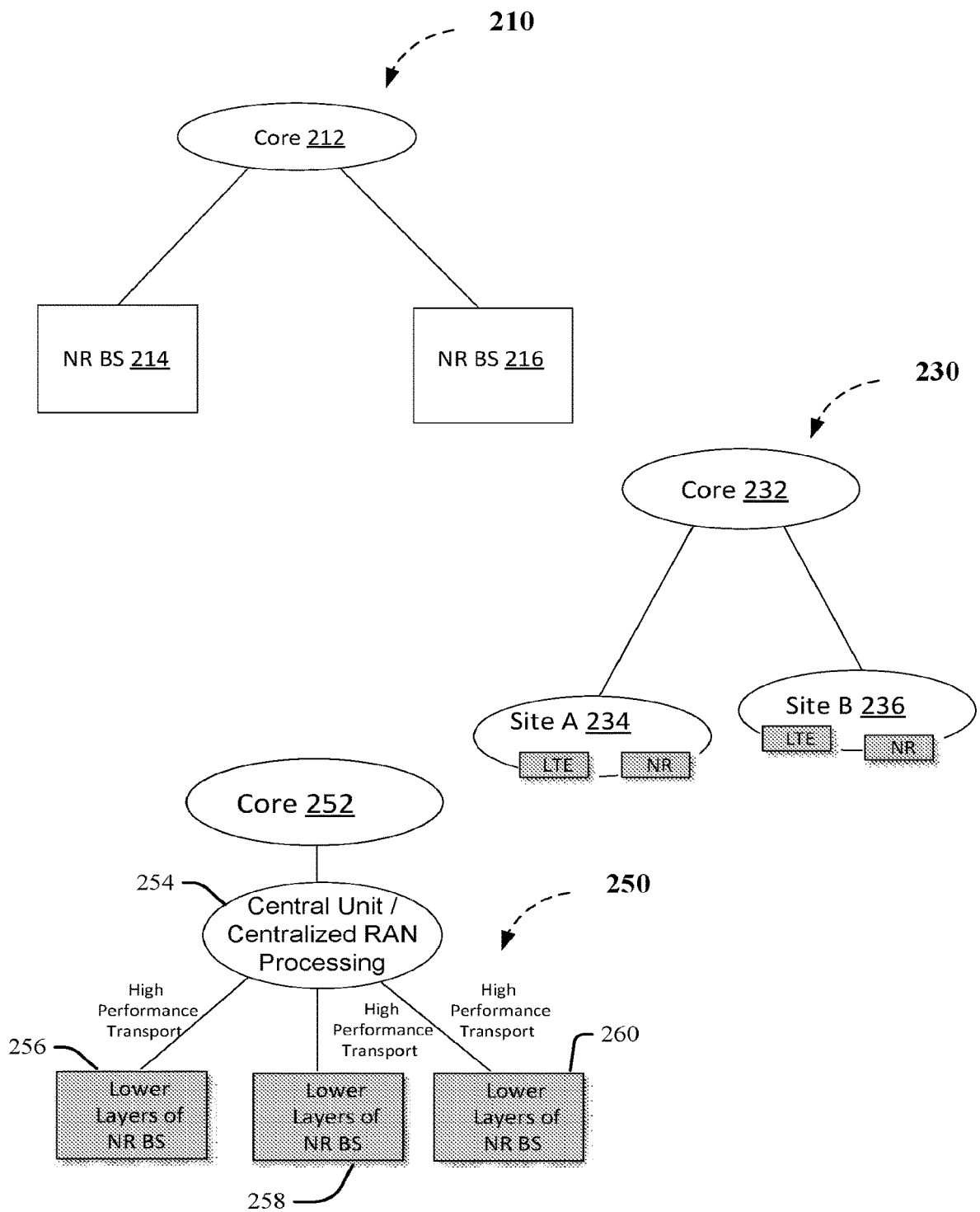
FIG. 2 illustrates exemplary radio network architectures that the 3GPP desires to support with NR including, for example, stand-alone, co-sited with LTE and centralized baseband architectures.
Figure 3:
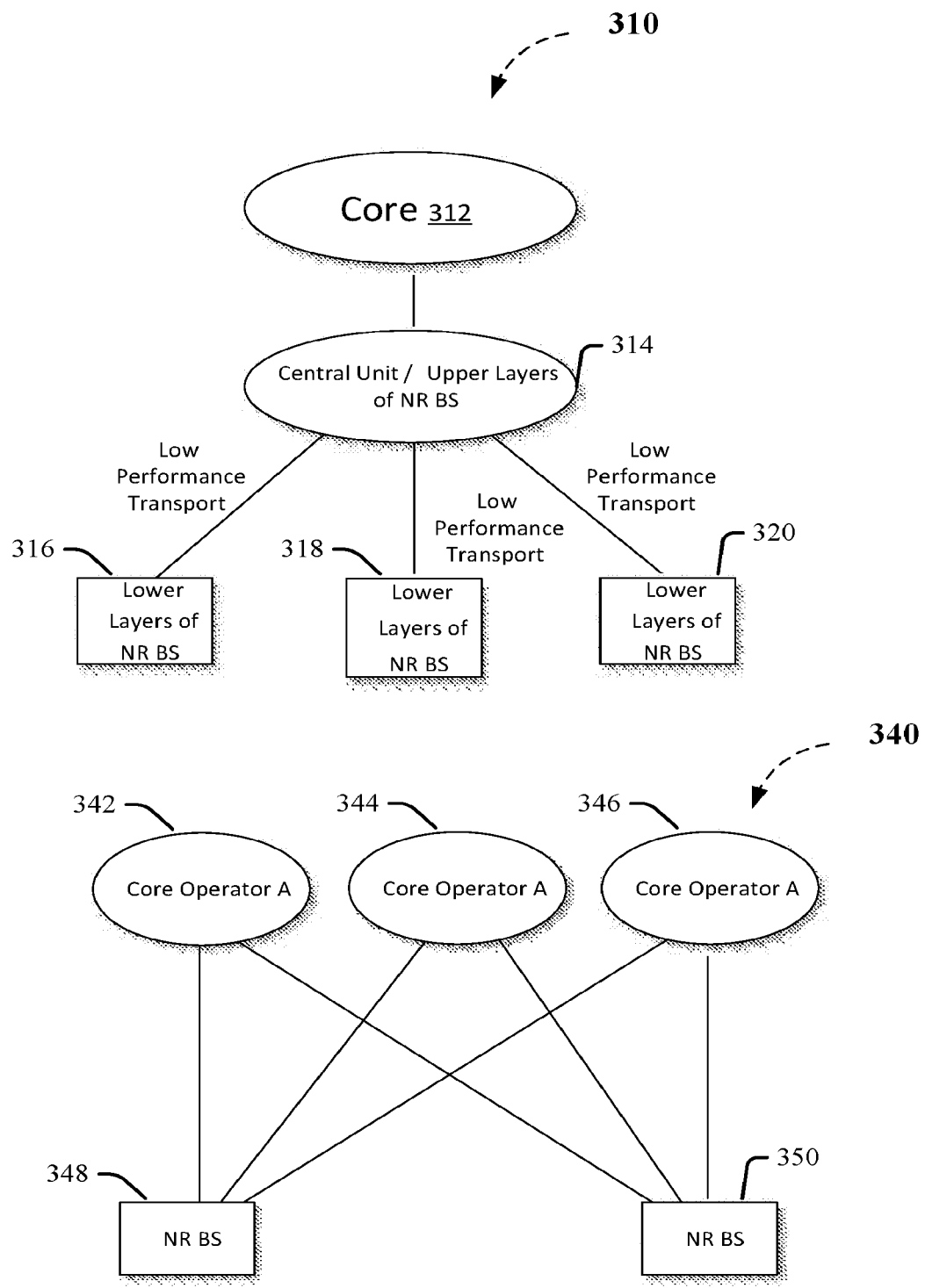
FIG. 3 illustrates more exemplary radio network architectures that the 3GPP desires to support with NR including, for example, centralized with low performance transport and shared RAN.

According to R3-160947 (3GPP TR 38.801 V0.1.0 (2016 April)), the scenarios illustrated in FIGS. 2 and 3 show exemplary radio network architectures that the 3GPP desires to support with the NR. FIG. 2 illustrates three example network architectures 210, 230 and 250. In the network architecture 210, the core network 212 is shown communicably coupled to two NR base stations 214 and 216.

In the network architecture 230, the core network 232 is communicably coupled to Sites A 234 and Site B 236, wherein those sites support both NR and LTE functionality. In network architecture 250, the core network 252 is communicably coupled to a central baseband unit 254, which serves as the central unit of the architecture 252 and performs centralized radio access network (RAN) processing. The central baseband unit 254, in turn, is communicably coupled to the lower layers of the NR base stations 256, 258 and 260 by way of high performance transport links.

FIG. 3 illustrates two more example radio network architectures 310 and 340 that the 3GPP desires to support with NR. In architecture 310, the core network 312 is communicably coupled to the central unit 314 that includes the upper layers of the NR base station. The central unit 314, in turn, is communicably coupled to the lower layers of the NR base stations 316, 318 and 320 via low performance transport links. In architecture 340, each core network operator 342, 344 and 346 is communicably coupled to both the NR base stations 348 and 350.

According to R2-164306 (3GPP TSG-RAN WG2 #94), the 3GPP desires to study the deployments of cell layouts for standalone NR in macro cells, heterogeneous cells and small cells. According to 3GPP TSG-RAN WG2 #94 meeting minutes for the May 23-26, 2016 meeting, one NR eNB corresponds to one or many TRPs. Typically, network controlled mobility involves two levels. In one level, the mobility control is driven by the RRC at the cell level. In the other level, there is zero or minimum involvement by the RRC (e.g. at MAC/PHY layers). According to R2-162210 (3GPP TSG-RAN WG2 Meeting #93bis), 3GPP desires to keep the principle of 2-level mobility handling in NR. One level would include cell level mobility and the other level would include beam level mobility management. Regarding cell level mobility, the cell selection or reselection occurs when the UE (or mobile device) is in IDLE state and the handover occurs when the UE or mobile device is in connected (CONN) state. The mobility control is driven by the RRC in the CONN state. Regarding beam level management, layer 1 (L1 or physical layer) handles appropriate selection of the TRP to be used by a UE (or a mobile device) and also handles the optimal beam direction.

5G systems are expected to rely heavily on "beam based mobility" to handle UE mobility, in addition to relying on the conventional handover based UE mobility. Technologies like MIMO, fronthauling, C-RAN and NFV will allow the coverage area controlled by a single 5G node to grow, thus increasing the possible applications for beam level management and reducing the need for cell level mobility. All mobility within the coverage area of one 5G node could be handled based on beam level management. In that scenario, handovers would only occur in case of UE mobility from the coverage area of one 5G node to the coverage area of another 5G node.

Figure 4:
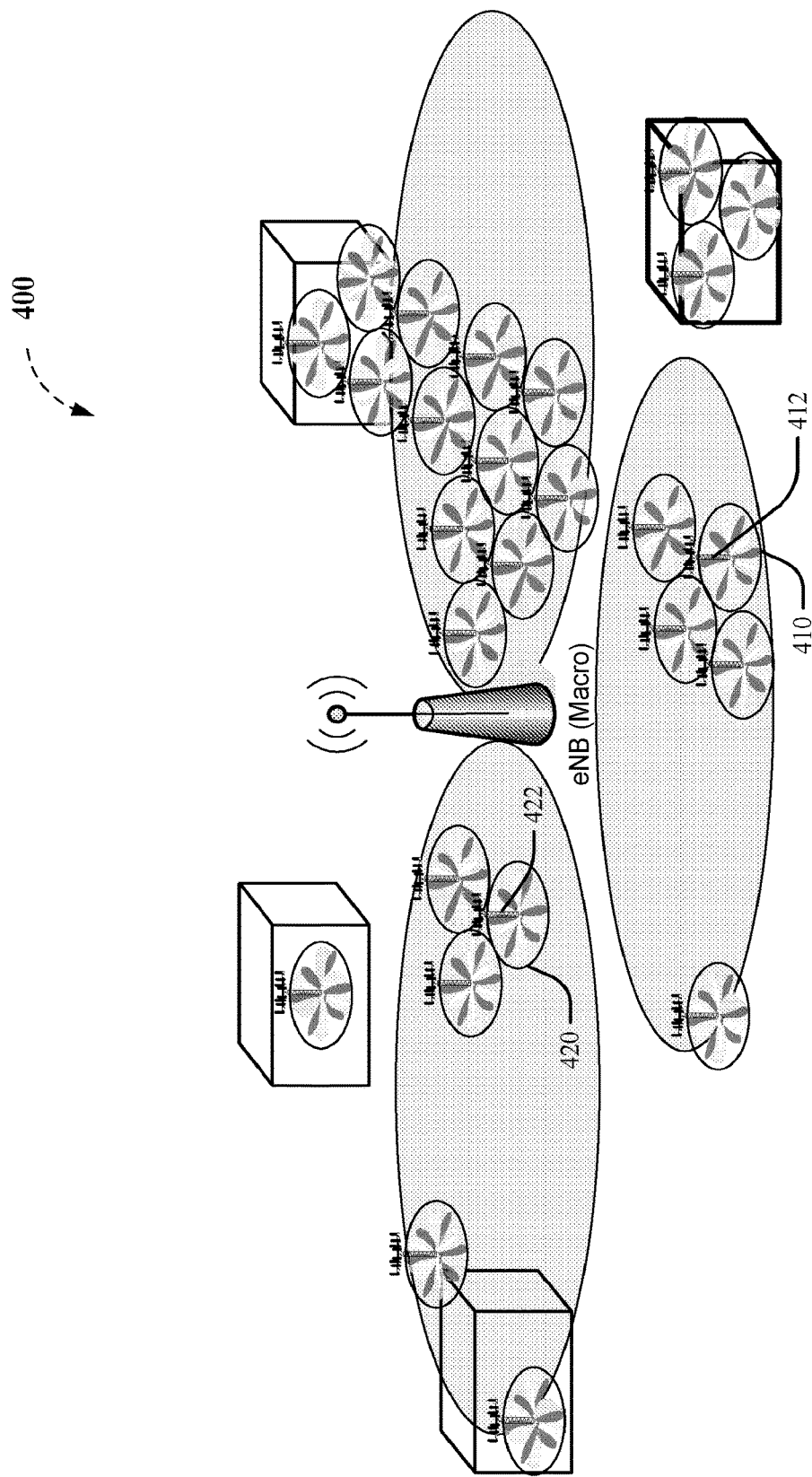
FIG. 4 illustrates various example deployment scenarios for arrangement of cells having a single TRP.
Figure 5:
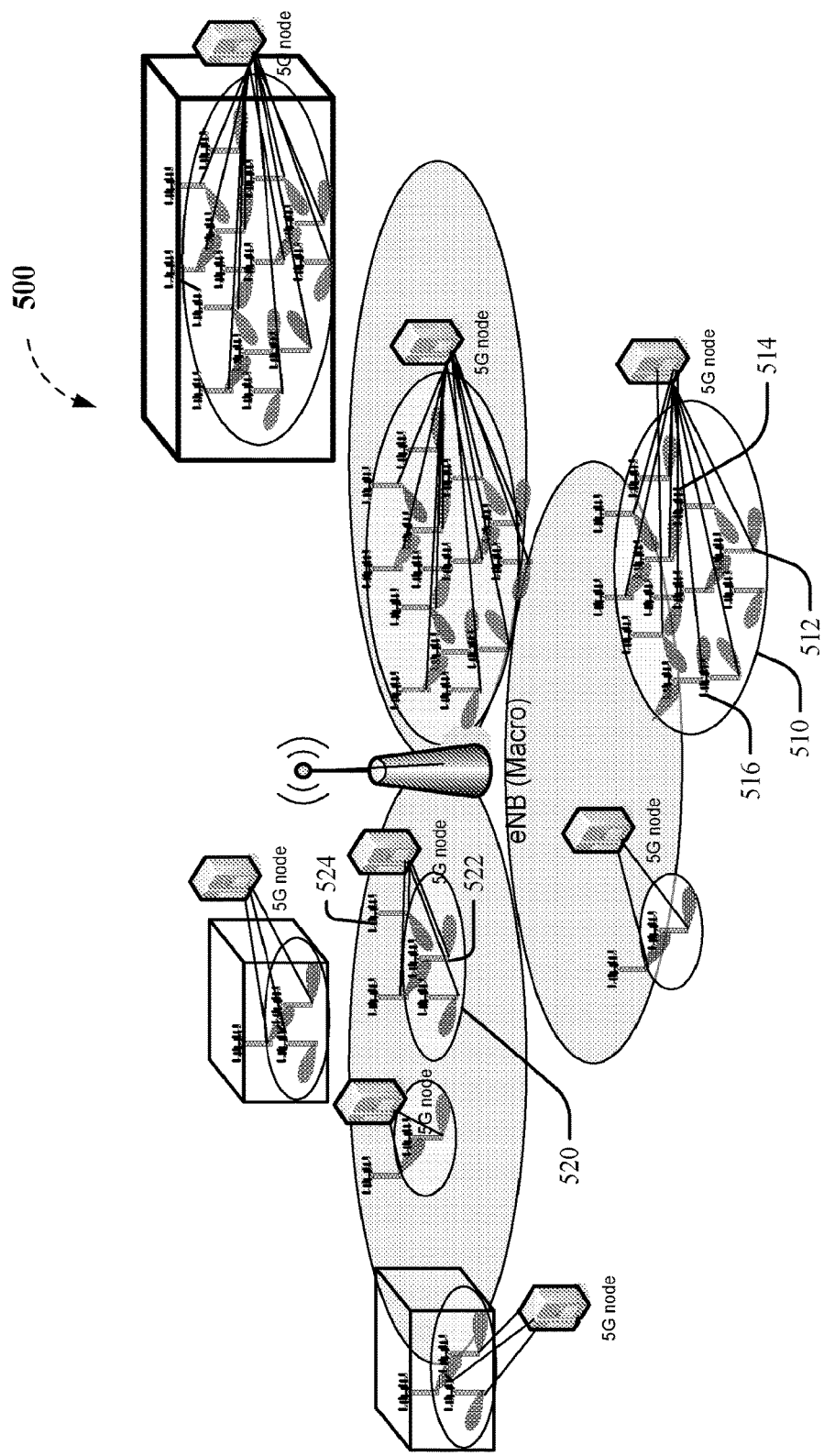
FIG. 5 illustrates various example deployment scenarios for arrangement of cells having multiple TRPs.
Figure 6:
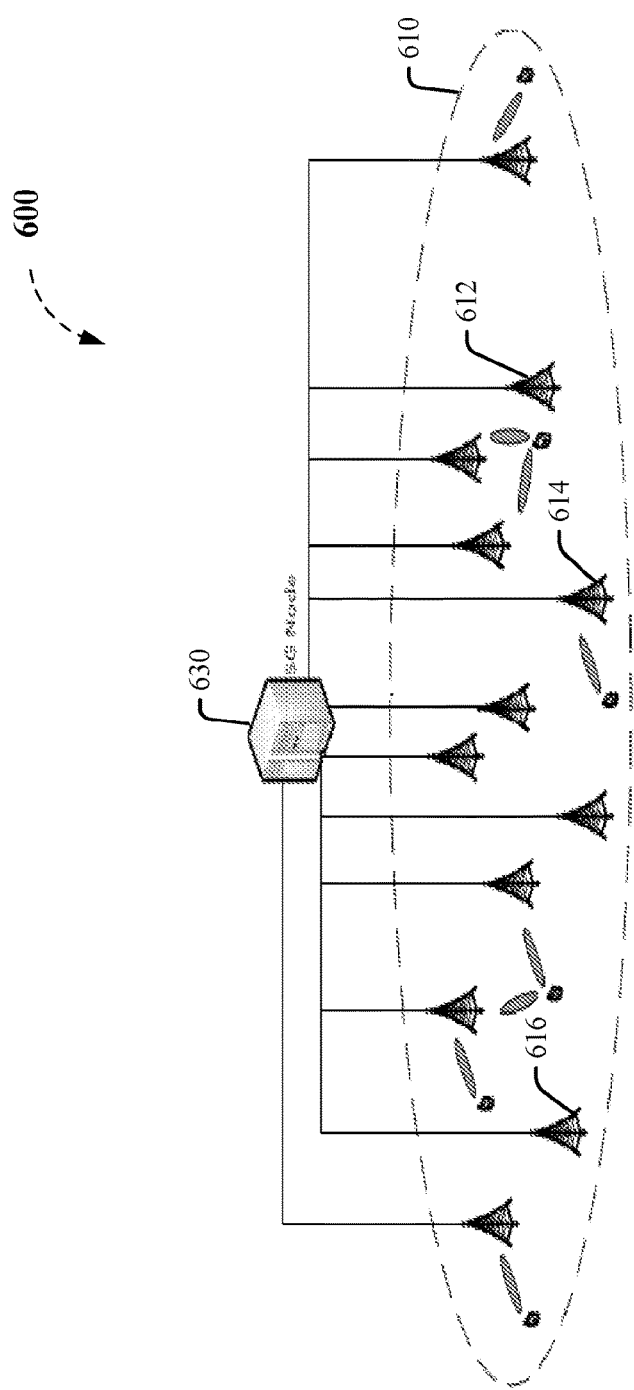
FIG. 6 illustrates an example 5G cell.
Figure 7:
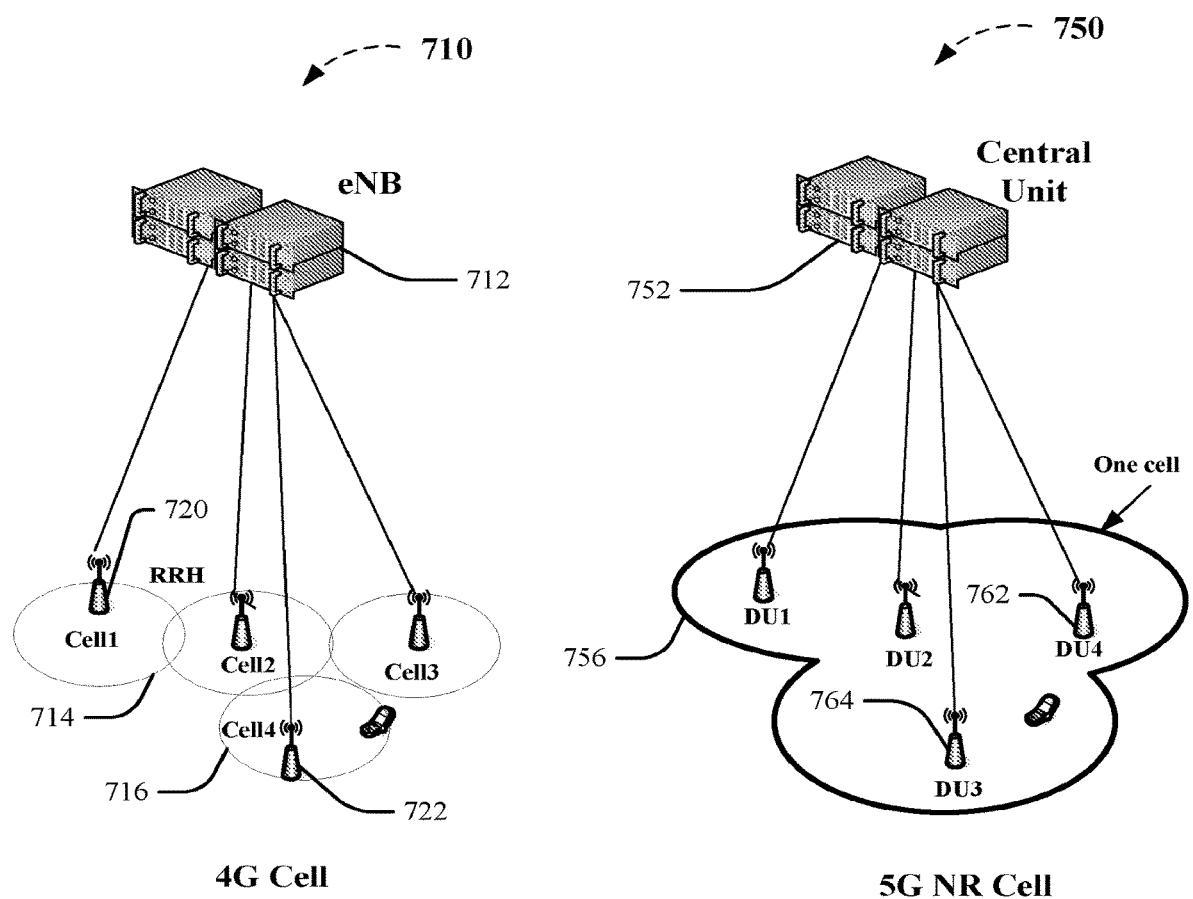
FIG. 7 illustrates side-by-side comparison between an example 4G cell and an example 5G cell.

FIGS. 4, 5, 6 and 7 show some examples of cell design in 5G NR. FIG. 4 shows an example deployment with a single-TRP cell. The deployment 400 includes numerous cells having a single TRP, for example cell 410 includes TRP 412 and cell 420 includes TRP 422. Some cells are clustered together and others are isolated. FIG. 5 shows an example deployment with multiple-TRP cells. The deployment 500 includes a cell 510 having multiple TRPs 512, 514 and 516. The deployment 500 also includes a cell 520 having TRPs 522 and 524. FIG. 6 shows an example deployment 600 having one 5G cell 610 comprising a 5G node 630 and multiple TRPs 612, 614 and 616. FIG. 7 shows a comparison between a LTE cell 710 and a 5G NR cell 750. The LTE cell 710 includes an eNB 712 communicably coupled to multiple cells 714 and 716. Cell 714 is shown to include TRP 720 and cell 716 is shown to include TRP 722. The NR cell 750 includes a centralized unit 752 communicably coupled to a single-cell 756. The single-cell 756 includes multiple distributed units (DU) 762 and 764. It will be understood that apart from performing a handover based on Radio Research Management (RRM) measurement, 3GPP desires that a 5G UE should be able to adapt the serving beam to maintain 5G connectivity even in case of beam quality fluctuation and/or UE intra-cell mobility. However, in order to do that, 5G Node-B and UE must be able to track and change the serving beam properly (referred to as beam tracking hereafter).

Some terminology and assumption are specified in the following and may be used hereafter. The term base station (BS), as used in the subject disclosure, refers to a network central unit in the NR that is used to control one or multiple TRPs associated with one or multiple cells. Communication between BS and TRP(s) can occur via a fronthaul connection. A BS could also be referred to as central unit (CU), eNB, or NodeB. A TRP, as used herein, is a transmission and reception point that provides network coverage and directly communicates with UEs. A TRP could also be referred to as a distributed unit (DU). A cell, as used herein, is composed of one or multiple associated TRPs, i.e. the coverage of the cell is a superset of the coverage of all the individual TRP(s) associated with the cell. One cell is controlled by one BS. A cell can also be referred to as a TRP group (TRPG). Beam sweeping is used to cover all possible directions for transmission and/or reception. For beam sweeping, numerous beams are required. As it is not possible to generate all these beams concurrently, beam sweeping means generation of a subset of these beams in one time interval and generation of different subsets of beam(s) in other time interval(s). Stated differently, beam sweeping means changing beams in time domain, such that all possible directions are covered after several time intervals. Beam sweeping number refers to the necessary number of time interval(s) needed to sweep beams in all possible directions once for transmission and/or reception. The control/instruction signaling related to beam sweeping would include a "beam sweeping number". The beam sweeping number indicates the number of times during a predetermined time period that various different subsets of beams must be generated to cover the desired area.

On the network side, a NR using beamforming could be standalone, meaning that the UE can directly camp on or connect to NR. Also, a NR using beamforming and a NR not using beamforming can coexist, for example, in different cells. A TRP can apply beamforming to both data and control signaling transmissions and receptions, if possible and beneficial. The number of beams generated concurrently by a TRP depends on the TRP's capability. For example, the maximum number of beams generated concurrently by different TRPs in the same cell may be the same and those in different cells may be different. Beam sweeping is necessary, e.g. for the control signaling to be provided in every direction. In various embodiments, downlink timing of TRPs in the same cell are synchronized. The RRC layer of the network side is located in the BS. The TRP should support both UEs with UE beamforming and UEs without UE beamforming, meaning that the TRP should support UEs of different capabilities and support UE designs based on different UE releases.

On the UE side, a UE may perform beamforming for reception and/or transmission, if possible and beneficial. The number of beams generated concurrently by a UE would depend on the UE's capability, for example, depending on whether generating more than one beam is possible for the UE. Beam(s) generated by a UE are typically wider than beam(s) generated by a eNB. Beam sweeping for transmission and/or reception is generally not necessary for user data but could be necessary for other signaling, for example, to perform a measurement. It is to be appreciated that not every UE supports UE beamforming, for example, due to UE capability or because UE beamforming was not supported by NR's first few release(s). One UE can to be served by multiple beams from one or multiple TRPs of the same cell. Same or different DL data could be transmitted on the same radio resource via different serving beams for diversity or throughput gain. There are at least two UE (RRC) states: connected state (or called active state) and non-connected state (or called inactive state or idle state).

According to an aspect of the subject disclosure, after a UE device powers on, it needs to find a cell to camp on. After camping on a cell, the UE device can initiate the establishment of a connection between itself and the network, for registration and/or data transmission purposes. In another embodiment, network requests the UE device, via paging, to initiate the connection establishment with the network. In this embodiment, the network may request the UE device to establish the connection because, for example, the network wants to transmit DL data to the UE device.

Figure 8:
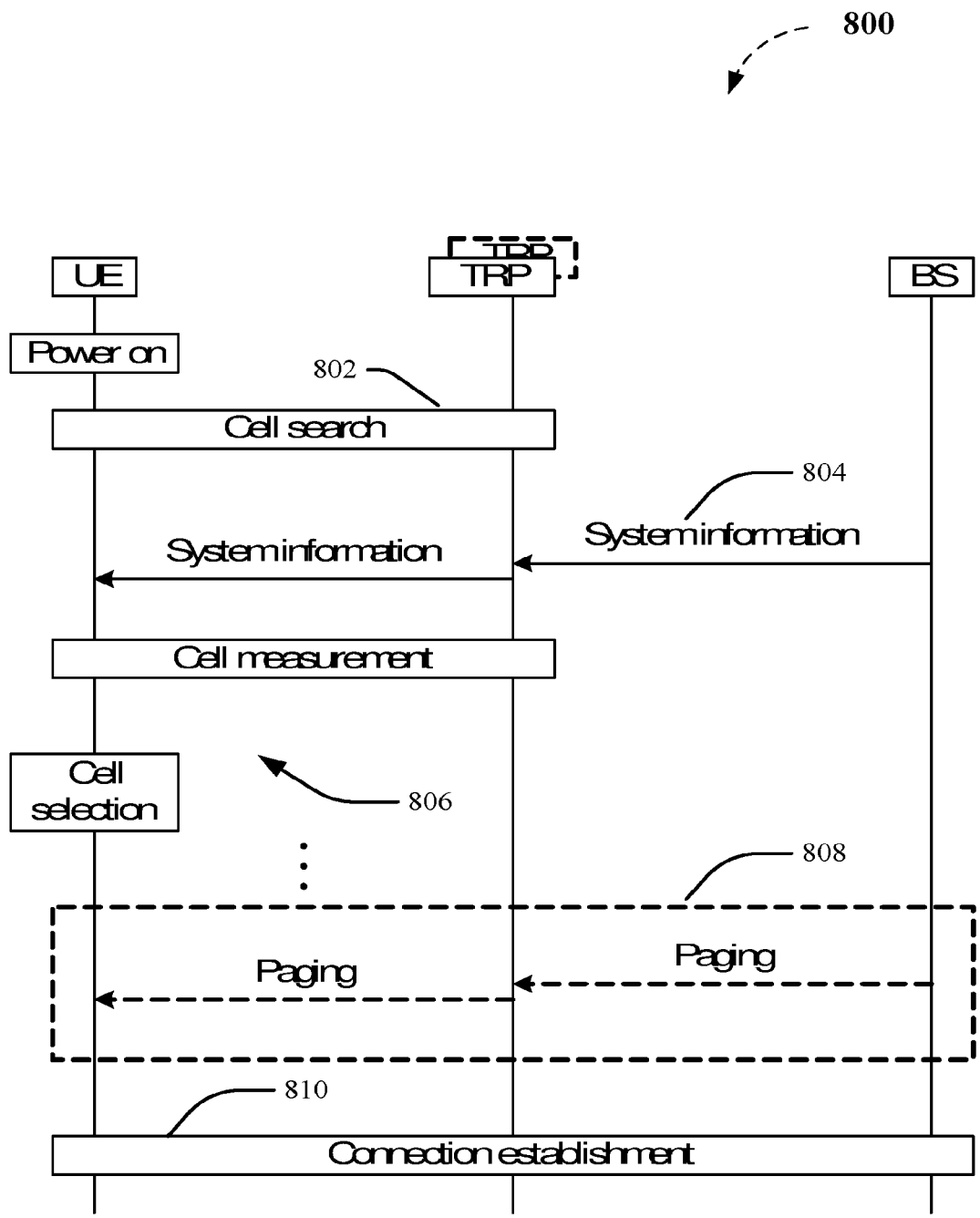
FIG. 8 illustrates an example methodology for an initial access communication between a UE device and a network.

FIG. 8 illustrates an example methodology by which a UE device makes/attempts an initial access to the network. At Step 802 of the flow diagram 800, the UE device searches for a cell that it can camp on. This step can happen when, for example, the UE device powers on. To find a cell to camp on, the UE device can scan possible carrier frequencies. A cell provides signaling for the UE devices to identify the cell, for example, synchronization signaling. The cell can provide the signaling by beam sweeping. Different TRPs of the same cell can provide the same type of signaling during the same time interval(s). At Step 804, the UE device performs acquisition of system information broadcasted by the cell. Specifically, the UE device acquires necessary parameters, e.g. related to cell selection, from the broadcasted system information. The broadcasted system information can be provided by the cell by beam sweeping. The system information can be provided by the BS of the cell to the TRP(s). The TRP(s), in turn, can broadcast the system information to the UE device.

At Step 806, the UE device performs cell measurement and selection. Specifically, after the UE finds a cell which is possible to camp on, the UE measures the radio condition of the cell and determines whether to camp on the cell based on the measured result. The cell provides the signaling, for example, reference signaling, for the measurement, by beam sweeping. Different TRPs of the same cell can simultaneously provide the signaling during the same time interval(s). At Step 808, the network pages the UE device. This is an optional step and the paging may be initiated when the network wants to transmit UE specific signaling/data to the UE and the UE is in a non-connected state. When the UE receives the paging, the UE initiates the connection establishment with the network to enter the connected state and can further receive the UE specific signaling/data from the network. The cell performs paging by beam sweeping. The paging can be performed by the TRP(s) upon receiving instructions from the BS.

At Step 810, the connection is established between the UE device and the network. Specifically, the UE establishes connection with the BS via connection establishment procedure. In one embodiment, during the establishment procedure, the UE device performs a random access procedure to inform the network to be aware of the presence of the UE device. Random access procedure is used by UE devices to initiate a data transfer. The UEs obtain uplink timing information from the initial handshake (or preamble). In turn, the network provides resources for a UL transmission to UE device. After the connection is established, the UE device enters into the connected state.

According to an aspect of the subject disclosure, after the UE camps on a cell, the UE can move among different beams or different TRPs of the cell when the UE is in a non-connected state (or idle mode). Or, the UE can leave the coverage of the cell and move to the coverage of a different cell. The mobility of the UE in a non-connected state can cause a UE beam change, a serving beam change or a cell reselection. If UE beamforming is used, the UE beam change can happen due to, for example, the UE device's rotation. This can happen when the UE is in a non-connected state. In this scenario, the UE may need to keep performing beam sweeping to avoid missing/ignoring of any signals due to UE beam changing.

Regarding the serving beam change, the serving beam change or the serving TRP change can occur among serving beams or TRPs of the same cell. With respect to the cell that the UE has camped on, the UE is served by TRP(s) whose signaling can be received by the UE. Serving beam(s) of serving TRP(s) can change due to UE mobility. Serving TRP(s) can also change when the UE moves within the cell that it is camped on. In this scenario, the UE may need to keep monitoring necessary signaling during all possible time intervals for different beams of the serving TRP(s) that are providing the necessary signaling for UE in non-connected state, to avoid missing any signaling from the network.

Regarding cell reselection, the UE typically continuously or semi-continuously performs measurements on the serving cell on which the UE is camping on and continuously or semi-continuously performs measurements on its neighboring cells, and evaluates whether to reselect the serving cell. The evaluation can include an evaluation of various attributes, characteristics, strengths and qualities of a cell. The UE can acquire system information of a neighbor cell and reselect the neighbor cell as the new serving cell if the UE determines that the neighbor cell is more optimal. To perform this task, the UE device requires parameters for evaluation of the cells from the network.

Figure 9:
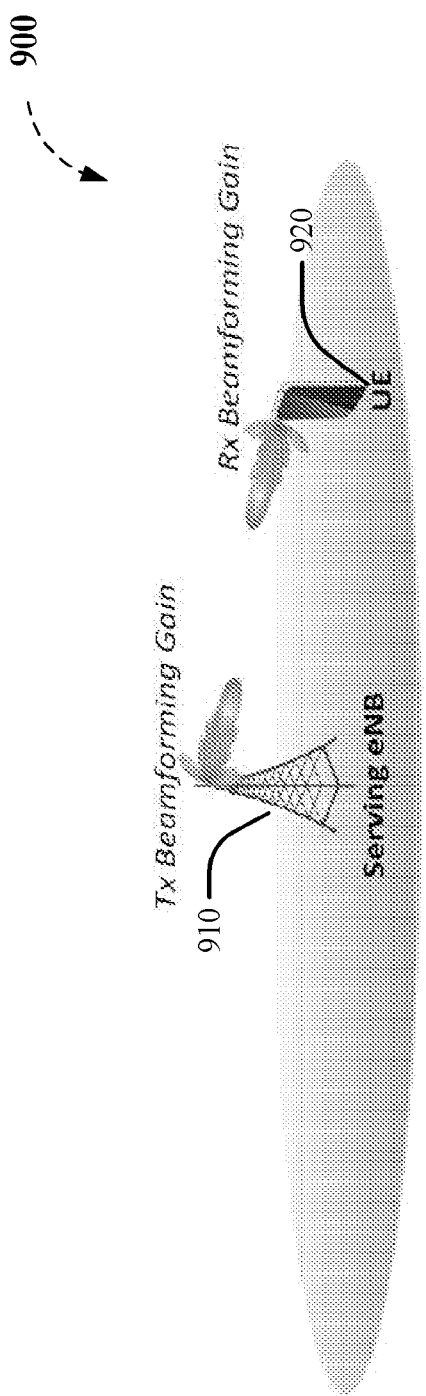
FIG. 9 illustrates an example high frequency HF-NR system that facilitates gain compensation by beamforming.

According to R2-162251 (3GPP TSG-RAN WG2 Meeting #92bis), beamforming can be performed on both eNB and UE sides. FIG. 9 illustrates the concept of gain compensation by beamforming in a high frequency (HF) NR system. In the example cell 900, beamforming is performed by both the eNB 910 and the UE 920. In one practical example, 3GGP expects the beamforming antenna gain at the eNB 910 to be about 15 to 30 dBi and the expected beamforming antenna gain at the UE 920 to be about 3 to 20 dBi.

Figure 10:
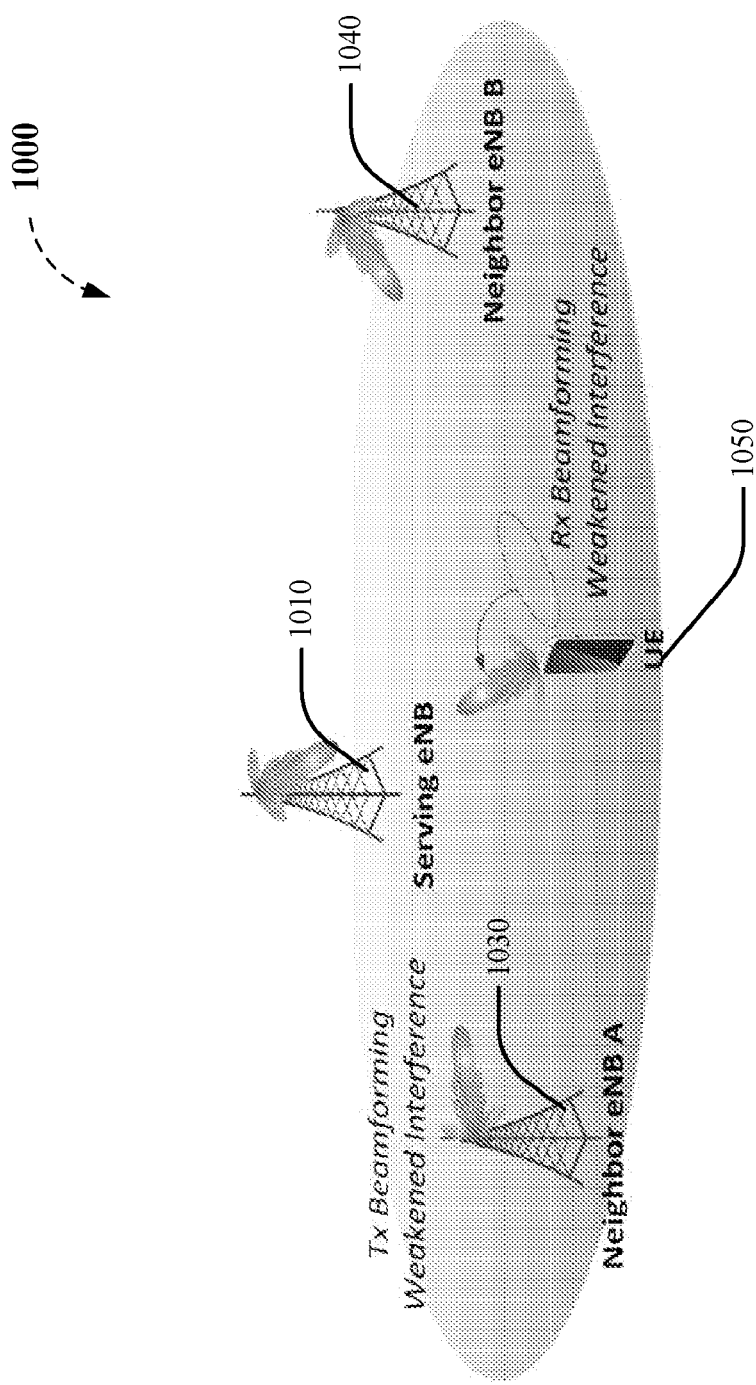
FIG. 10 illustrates an example HF-NR system that facilitates weakened interference by beamforming.

From SINR perspective, FIG. 10 illustrates a cell 1000 in which interference is weakened because of beamforming. Sharp beamforming reduces interference power at the serving eNB 1010 from neighboring interferers eNB A 1030 and eNB B 1040, for example, during a downlink operation.

Interference power from UEs connected to neighboring eNBs 1030, 1040 is also reduced because of beamforming. It is to be understood and appreciated that in a TX beamforming case, effective interference will be caused only by other TXs whose current beam(s) are also pointed in the direction of the RX. Effective interference means that the interference power is higher than the effective noise power. In a RX beamforming case, effective interference will be caused only by other TXs whose beam(s) are pointed in the same direction as the UE's 1050 current RX beam direction.

UE beamforming is beneficial for reception and/or transmission, e.g. in order to increase antenna gain, especially in a high frequency band. When the UE is in connected state, UE beamforming is beneficial to increase antenna gain. However, the cost is that UE power consumption and delay are increased because of UE beam sweeping for transmission and reception. There is thus a trade-off between using UE beamforming and not using UE beamforming. UE beamforming should be used when necessary. When unnecessary, UE beamforming should be avoided.

It may be beneficial if the network is generally in control of determining whether the UE needs to perform UE beamforming and/or determining the number of UE beams to be generated. Network can depend on, e.g. measurement performed by the network, feedback of measurement performed by the UE, or etc., to make the decision. Related configuration and the change of UE beamforming can be explicitly or implicitly indicated by RRC message, a MAC control signaling, physical layer signaling (e.g. PDCCH in LTE), and/or the like.

Mobility in a connected state without cell change is now specified in the following. When the UE is in a connected state, the UE may move among different beams or different TRPs of the same serving cell. Besides, if UE beamforming is used, UE beam(s) may also change over time, e.g. due to UE rotation. An example of mobility in a connected state without cell change may have the following steps:

Signaling for change detection: Change of UE beam(s), serving beam(s) of serving TRP(s), and serving TRP(s) may be detected by UE and/or network. In order to detect the change, a signaling periodically transmitted by TRP(s) or UE could be used. TRP(s) periodically perform beam sweeping for reception or transmission of the signaling. If UE beamforming is used, UE periodically performs beam sweeping for reception or transmission of the signaling.

UE beam change: If the change is detected by UE, UE itself may select proper UE beam(s) for the following reception (and transmission, e.g. for TDD). Alternatively, UE needs to provide feedback to network and network could provide an indication of UE beam change from network to UE. If the change is detected by network, indication of UE beam change from network to UE may be required. UE uses UE beam(s) indicated by network for the following transmission (and reception, e.g. for TDD).

Serving beam and/or serving TRP change: After UE receives the signaling for change detection, UE needs to provide feedback to network and network could decide whether to change (DL) serving beam(s) and/or serving TRP(s) for the UE. On the other hand, after TRP(s) receive the signaling for change detection, network could decide whether to change serving beam (s) and/or serving TRP(s) for the UE.

Figure 11:
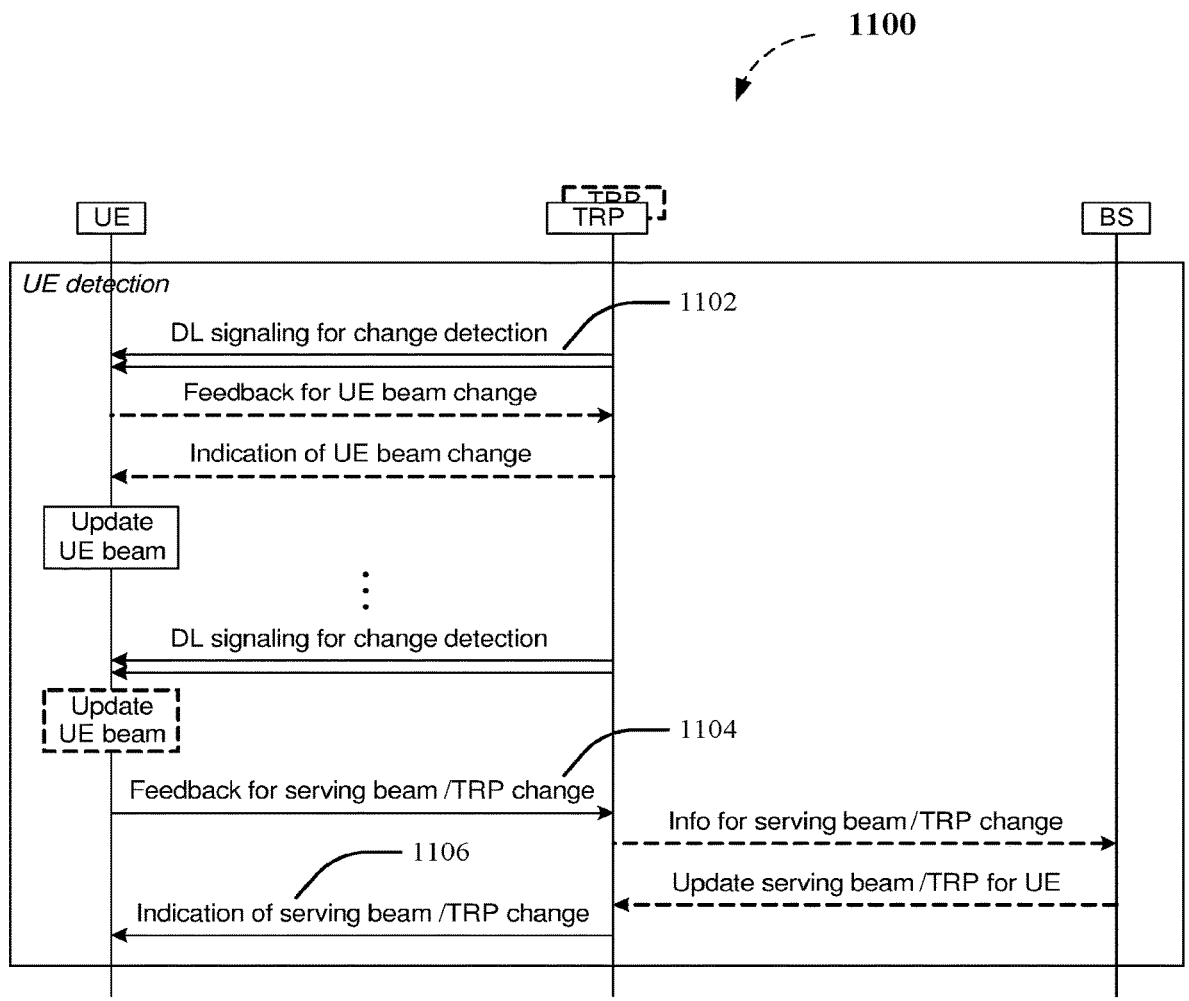
FIG. 11 illustrates an example methodology for managing UE mobility in a connected state without cell change (based on UE detection)
Figure 12:
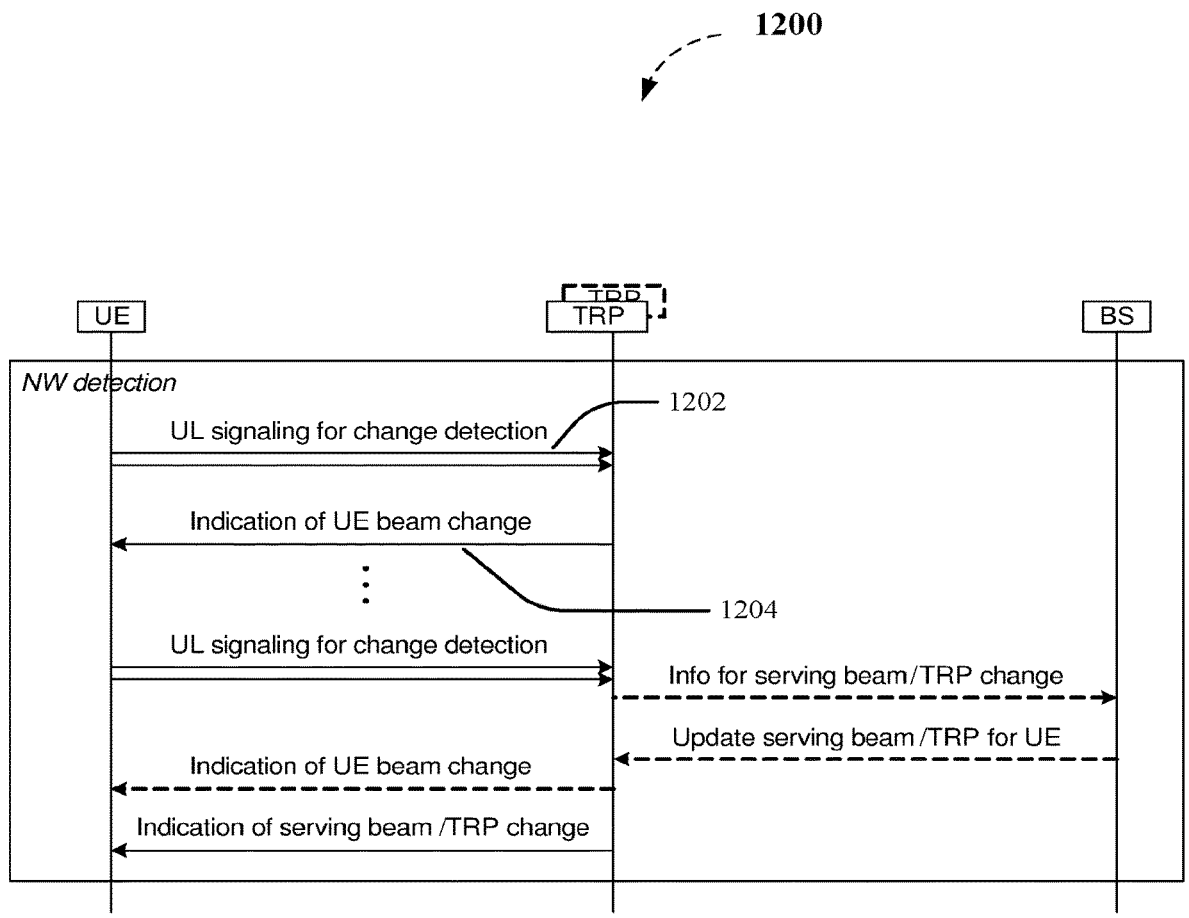
FIG. 12 illustrates an example methodology for managing UE mobility in a connected state without cell change (based on network detection)

FIGS. 11 and 12 illustrate examples of flow charts for mobility in connected state without cell change. Flow chart 1100 in FIG. 11 illustrates mobility based on UE detection. According to some of the steps illustrated in the flow chart 1100, the UE detects a beam or TRP change based on DL signaling received from the network (1102). The UE may provide feedback to the network (1104), for example, about a proper beam that should be used, and the UE receives an indication from the network acknowledging the feedback (1106). Flow chart 1200 in FIG. 12 illustrates mobility based on network detection. According to some of the steps illustrated in the flow chart 1200, the network detects a beam change based on UL signaling received from the UE (1202), and the network sends an indication to the UE acknowledging the beam change (1204).

According to an aspect of the subject disclosure, when the UE is in a connected state, for example, a connected state in which there has not been any data communication between the network and the UE for a certain period of time, the UE can initiate an UL transmission. For example, the UE can initiate an UL transmission upon arrival of new data at the UE that the UE wants to send to the network. For example, the user of the UE may input a text or voice message into the UE, and the UE wants to send that message to the network.

Figure 13:
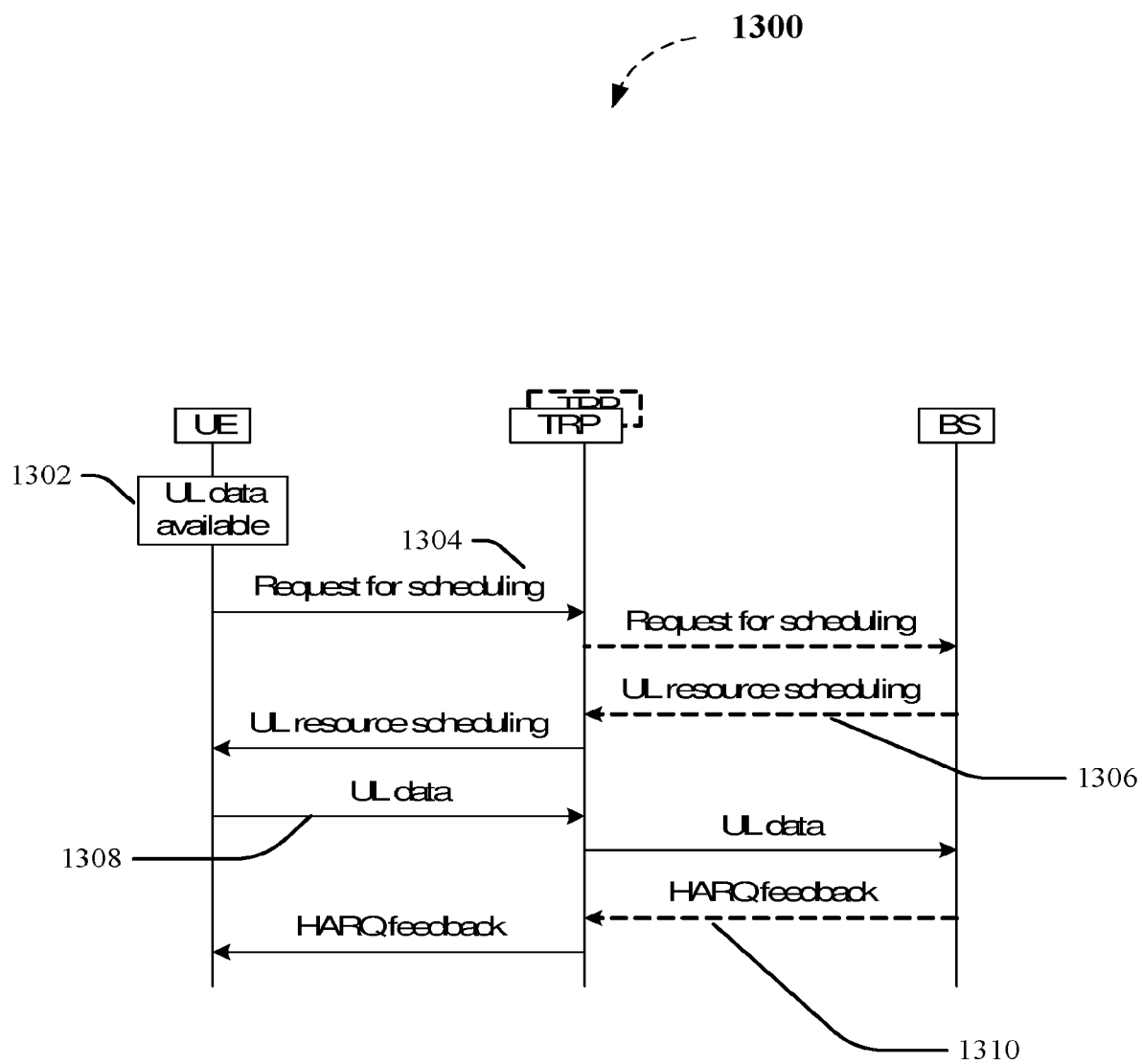
FIG. 13 illustrates an example methodology for UL transmission from a UE device to a network.

FIG. 13 illustrates an example methodology for a UL data transmission from the UE device to the network. At Step 1302 of the flow diagram 1300, the UE device determines that it has UL data available for transmission to the network but has no UL resources that can be used to perform the transmission. To obtain those resources, at Step 1304, the UE device sends (or transmits) a scheduling request to the network and requests UL resources. In various embodiments, the UL timing of the UE device may or may not be synchronized with the network/cell when the UE transmits the request. The UE device may transmit the scheduling request by beamforming. In various embodiments, the UE device may or may not use beam sweeping to transmit the request.

At Step 1306, the network performs UL resource scheduling. The UE device's scheduling request is received by one or more TRPs of the network. In one embodiment, a TRP that receives the request schedules proper UL resources for the UE device to perform UL transmission. In another embodiment, the TRP schedules the proper UL resources in coordination with the network's base station (BS). In yet another embodiment, the TRP sends the UE device's request to the BS and the BS schedules the proper UL resources and communicates that information to the TRP. The TRP, in turn, provides the scheduling information about UL resources to the UE device. The UL timing of the UE device can be adjusted together with the UL resource scheduling. The TRP provides the UL resource scheduling information by beamforming.

At Step 1308, the UE device performs UL data transmission. After the UE device receives UL resource scheduling, the UE device uses the UL resources to transmit pending UL data. The UE device may use UE beamforming for UL transmission. The TRP uses beamforming to receive the UL transmission from the UE device. Other information, for example, CSI, buffer status report (BSR), power headroom report (PHR), may be transmitted with the UL data to the TRP or BS. At Step 1310, the network, meaning the BS or the TRP, provides hybrid automatic repeat request (HARQ) feedback to the UE device to indicate whether the UL transmission was successfully received. The UE may have to perform retransmission if network fails to receive the UL transmission.

According to an aspect of the subject disclosure, when the UE device is in a connected state, for example, a connected state in which no data communication has occurred between the network and the UE device for a certain period of time, the BS (meaning the network side) can initiate a DL transmission to the UE device upon new data arrival at the network. For example, the network may receive a text or voice message intended for the user of the UE device that it wants to send to the UE device.

Figure 14:
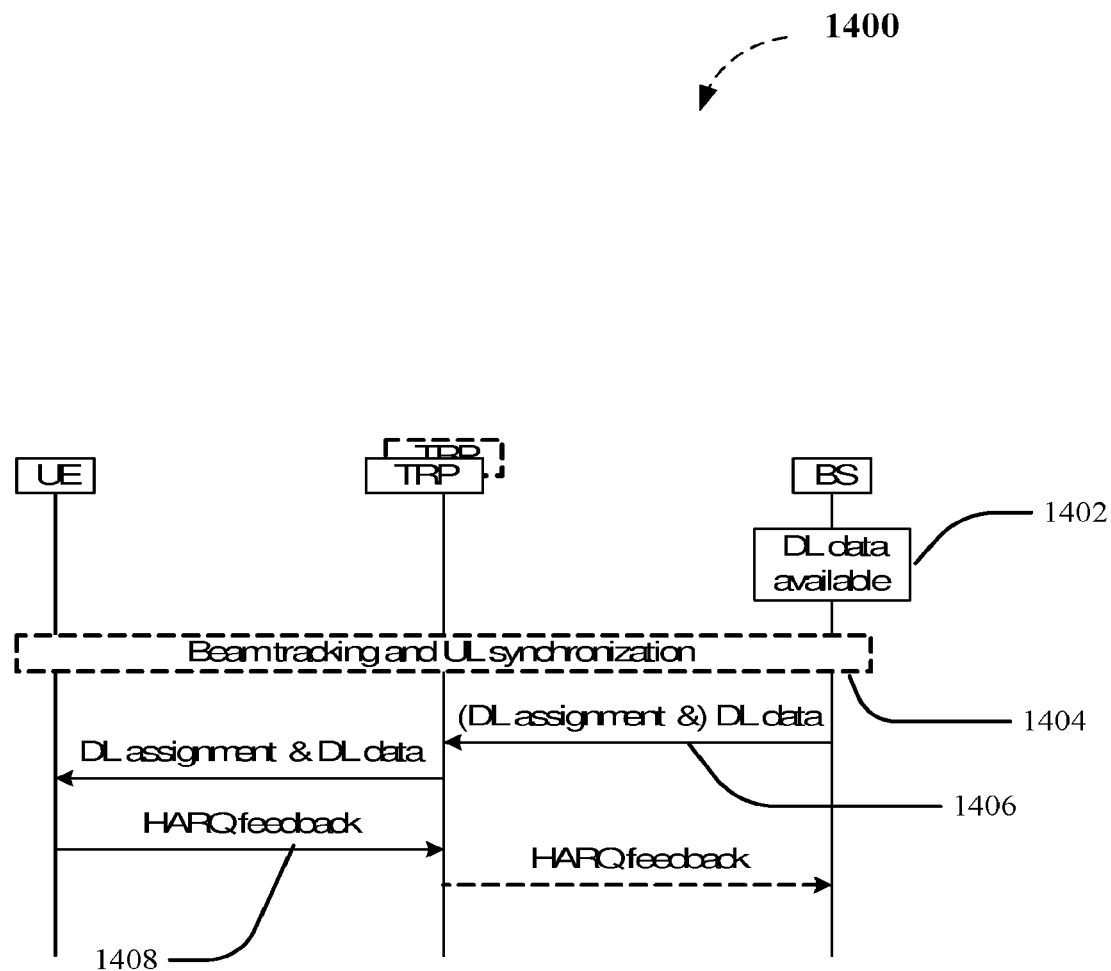
FIG. 14 illustrates an example methodology for DL transmission from a network to a UE device.

FIG. 14 illustrates an example methodology for a DL data transmission from the network to the UE device. At Step 1402 of the flow diagram 1400, the network prepares for the DL transmission to the UE device. Specifically, when network has DL data to be transmitted to the UE device, the network determines the proper TRP(s) and the beam(s) to reach the UE device. In various embodiments, beam tracking (or beam finding) may be used. Also, the UL timing of the UE device must be synchronized with the network/cell before performing the DL transmission. The DL data arrival may be achieved via random access (RA) procedure. At Step 1404, the network, by way of the BS or the TRP, selects the proper DL resources for transmission of DL data and informs the UE, via a DL assignment, to expect and receive the DL data. At Step 1406, the transmission of DL assignment and DL data occurs. The DL assignment and DL data are provided by beamforming in beam(s) that can reach the UE device. UE beamforming may be used for DL reception. DL assignment may be determined by TRP or BS. At Step 1408, the UE device provides HARQ feedback to the network to indicate whether the DL transmission was successfully received. The network may need to perform retransmission if the UE device fails to receive the DL transmission.

Figure 15:
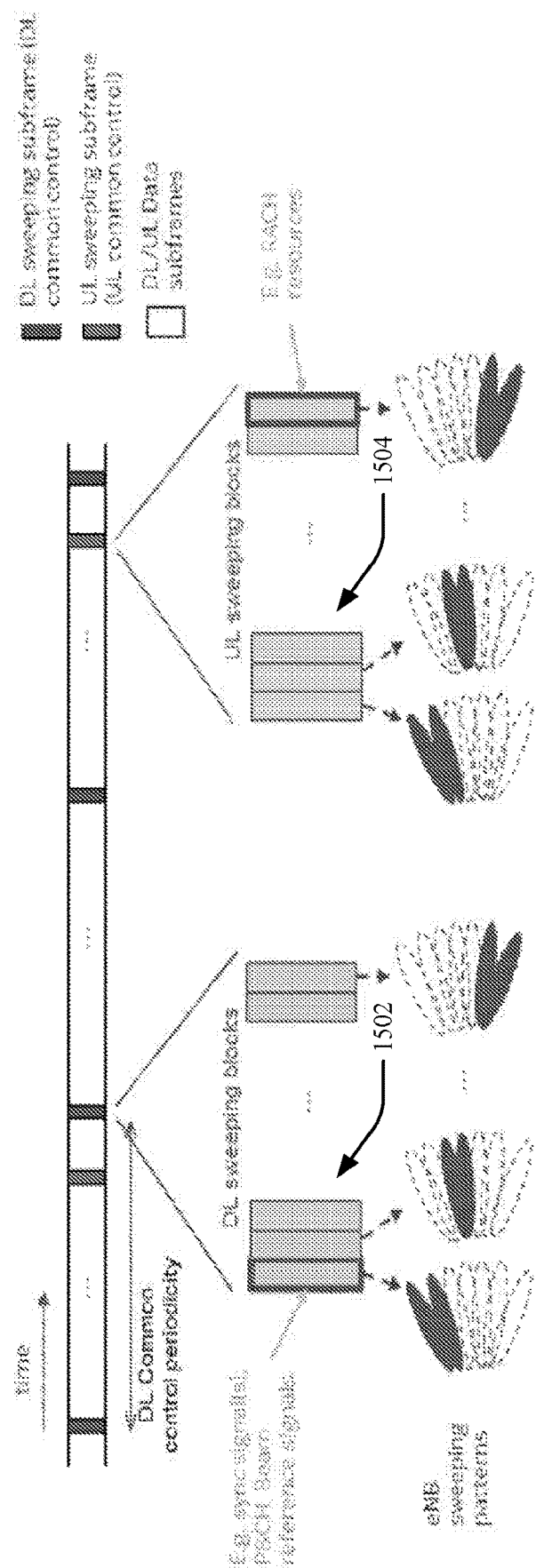
FIG. 15 illustrates the principle of a sweeping subframe.
Figure 16:
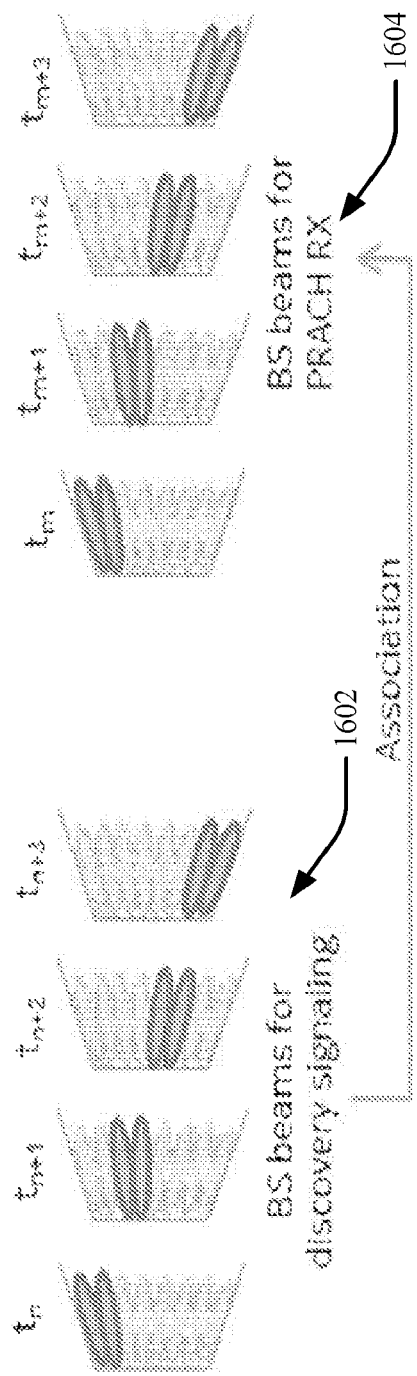
FIG. 16 illustrates the association between the BS beams and the PRACH resources.

According to R1-165364 (3GPP TSG-RAN WG1 #85), 3GPP has proposed to concentrate (or insert) sweeping common control plane functionality into specific subframes, referred to as sweeping subframes. The common control signaling that the 3GPP desires to transmit via the sweeping subframes include a synchronization signal (DL), a reference signal (DL), system information (DL) and random access channel information (UL). FIG. 15 illustrates the principle of a sweeping subframe and shows the DL sweeping blocks 1502 and the UL sweeping blocks 1504 transmitted at different times. One of the main use cases of downlink sweeping is downlink discovery signaling, which comprises, for instance, signals for cell search, time and frequency synchronization acquisition, essential system information signaling and cell/beam measurements (e.g. RRM measurements). For UL PRACH (physical random access channel), the 3GPP desires to utilize BS beam reciprocity and enable a UE to transmit PRACH preamble when BS is receiving by beam(s) with high array gain pointed towards the transmitting UE. That means the PRACH resources are associated with BS beams, which are advertised periodically through DL discovery signaling. The DL discovery signaling conveys beam specific reference signals. FIG. 16 illustrates the association between BS beams 1602 and PRACH resources 1604.

According to an aspect of the subject disclosure, regarding indication of UE beam(s), which UE beam(s) are used for transmission and/or reception is controlled by the network. The network can consider factors such as channel quality of different UE beams, load balancing or congestion of network beams, and the like. Network can indicate to a UE about UE beam(s) to be used by the UE. One possible alternative is to explicitly or implicitly indicate UE beam(s) for transmission or reception together with scheduling information for transmission or reception, e.g. in physical layer signaling like PDCCH in LTE. Alternatively, indication can be based on which UE beam(s) receive scheduling information for transmission or reception. UE beam specific configuration, per UE beam, can be used to differentiate different UE beams.

In general, the UE in connected mode should maintain information about which UE beam(s) to be used for a transmission and/or a reception, e.g. based on the indication from network or beam tracking. However, in some cases, for example, when all UE beam(s) previously used for transmission and/or reception are changed, or because of beam tracking failure, the network is unable to indicate to the UE about the UE beam change and the UE is unable to determine on its own which UE beam is usable. Also, sometimes, the UE beam information becomes out-of-date. In such cases, a transmission or a reception may not be successfully completed using out-of-date UE beam information, until the UE beam information is updated.

In order to be aware of UE beam change or increase reception reliability of some signaling, the UE can perform UE beam sweeping for receiving a specific signaling, for example, to receive indication of UE beam change, indication of serving beam or serving TRP change, request of transmitting UL reference signal, or etc. The UE beam sweeping for reception may be performed periodically. Periodicity can be controlled by network. Alternatively, the UE beam sweeping for reception may be performed aperiodically. The UE may trigger UE beam sweeping for reception based on detection of some event, e.g. radio link failure, beam misalignment, that there is no data transmission for a period of time, or the uplink timing is not aligned.

The UE can attempt to receive the specific signaling in DL sweeping subframe(s). The network can transmit the specific signaling in DL sweeping subframe(s).

If the UE has means to detect which UE beam is to be used for the reception, e.g. via performing UE beam sweeping to monitor DL sweeping subframe(s), the UE can monitor or receive the signaling on the detected UE beam and without using UE beam sweeping. The UE may attempt to receive a common signal from multiple UE beams, and the detected UE beam may be the UE beam where the common signal is received successfully. The common signal may be a synchronization signal, a reference signal or a discovery signal.

In order to increase transmission reliability of some signaling or to provide the network with a measurement opportunity, the UE can perform UE beam sweeping for transmitting a specific signal, e.g. to transmit (periodic or aperiodic) feedback of measurement for a UE beam, serving beam, or serving TRP change, indication for UE beam, serving beam or serving TRP change, (periodic or aperiodic) UL reference signal, scheduling request, or the like. The UE beam sweeping for transmission may or may not be performed periodically. The signaling or timing to apply UE beam sweeping could be predefined, configured by network, or dynamically requested by network, e.g. together with scheduling information for transmission. The UE may trigger UE beam sweeping for transmission by detecting some event, e.g. radio link failure, beam misalignment, that there is no data transmission for a period of time, or the uplink timing is not aligned.

The UE can transmit the specific signaling in UL sweeping subframe(s). The network can try to receive the specific signaling in UL sweeping subframe(s).

If the UE has means to detect which UE beam is to be used for the transmission, e.g. via performing UE beam sweeping to monitor DL sweeping subframe, the UE can transmit the signaling on the detected UE beam and not use UE beam sweeping. The UE may attempt to receive a common signal from multiple UE beams, and the detected UE beam can be the UE beam where the common signal is received successfully. The common signal may be a synchronization signal, a reference signal, or a discovery signal.

The UE is capable of UE beamforming. The network node could be one or more of the following: central unit (CU), distributed unit (DU), transmission/reception point (TRP), base station (BS), or a 5G node.

Figure 17:
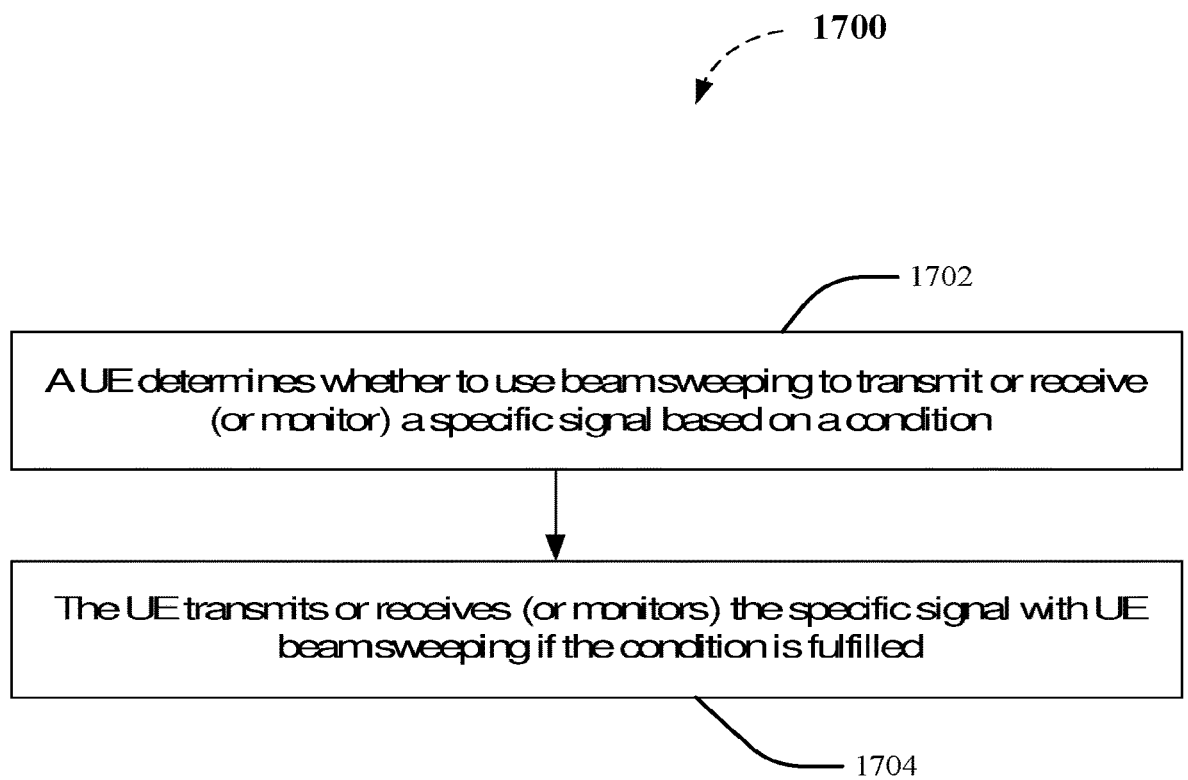
FIG. 17 illustrates an example methodology for transmitting, receiving or monitoring a specific signal based on a condition.
Figure 18:
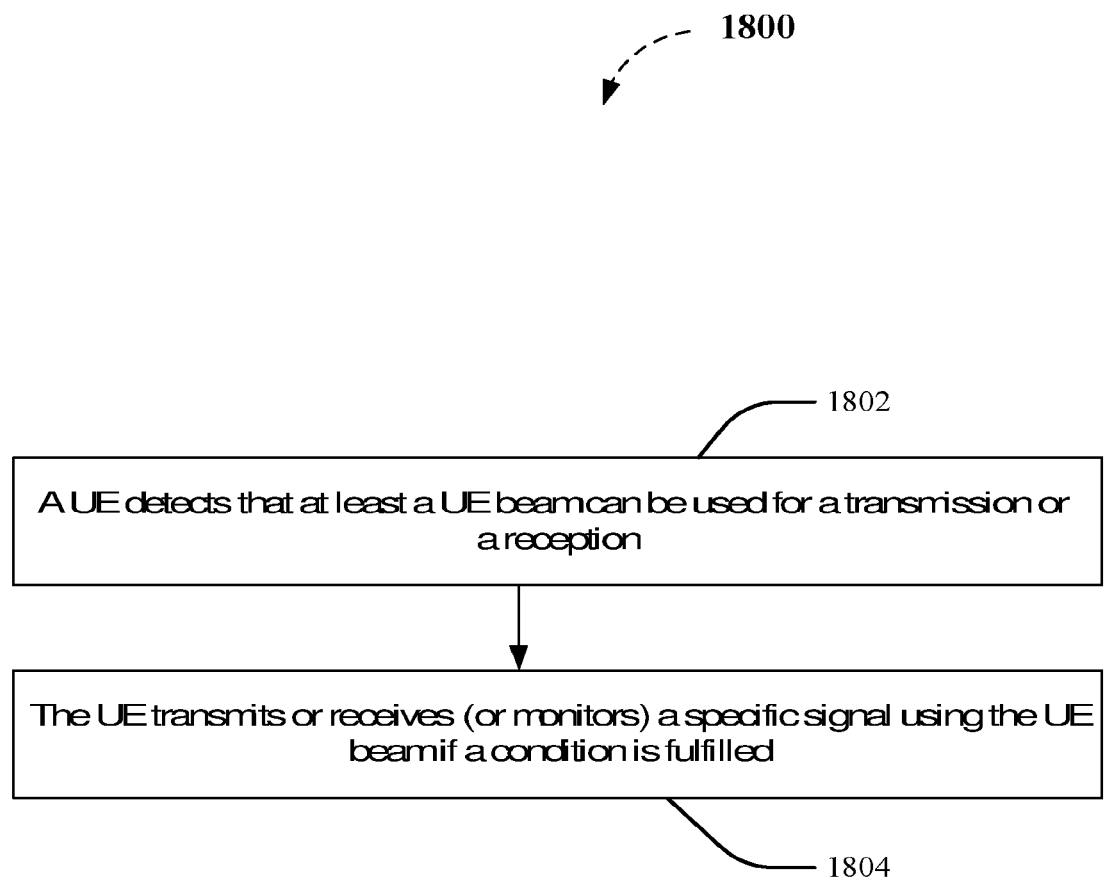
FIG. 18 illustrates another example methodology for transmitting, receiving or monitoring a specific signal based on a condition.

FIG. 17 illustrates an example methodology according to an aspect of the subject disclosure. At Step 1702 of the flow diagram 1700, a UE determines whether to use beam sweeping to transmit or receive (or monitor) a specific signal based on a condition. At Step 1704, if the condition is fulfilled, the UE transmits or receives (or monitors) the specific signal with UE beam sweeping. FIG. 18 illustrates another example methodology according to an aspect of the subject disclosure. At Step 1802 of the flow diagram 1800, a UE detects one or more UE beams that can be used for transmission or reception. At Step 1804, if a condition is fulfilled, the UE transmits or receives (or monitors) a specific signal with a UE beam of the one or more UE beams.

The methodologies illustrate in FIGS. 17 and 18 can be implemented with the following clarifying, additional or alternative example steps. In a non-limiting example, the UE receives an indication from network about at least one UE beam to be used for a transmission or reception. The UE uses the at least one UE beam for the transmission or reception. Then, if a condition is fulfilled, the UE transmits or receives a specific signal using a specific UE beam, which is not one of the at least one UE beam. The specific UE beam is selected by the UE.

In a non-limiting example, the UE does not use UE beam sweeping to transmit or receive (or monitor) the specific signal. In a non-limiting example, transmitting or receiving (or monitoring) the specific signal with UE beam sweeping means to transmit or to receive (or to monitor) the specific signal multiple times, where different UE beam(s) are used in the different times of transmission, reception or monitoring.

In various non-limiting examples, the specific signal can be an indication about UE beam change, or an indication about a serving beam or serving TRP change. In various non-limiting examples, the specific signal includes a request of transmitting UL reference signal, a feedback of measurement for UE beam change, serving beam and/or serving TRP change, and/or an indication for UE beam change, serving beam and/or serving TRP change.

In various non-limiting examples, the specific signal is a UL reference signal or a scheduling request. In various non-limiting examples, the UE beam sweeping for the specific signal is stopped when the UE receives the specific signal successfully, the UE receives a UL grant, or the UE receives a confirmation. In various non-limiting examples, the UE transmits or receives (or monitors) the specific signal periodically or aperiodically. In a non-limiting example, the periodicity of the transmission or the reception is configured by network.

In various non-limiting examples, the condition to be fulfilled discussed above comprises that periodicity to transmit or receive (or monitor) the specific signal is reached, that a radio link has failed, that a UE and/or serving beam is misaligned, that all the UE beam(s) previously used for transmission and/or reception are changed, that there is beam tracking failure, that there is no data transmission for a period of time, that the uplink timing is not aligned. In various non-limiting examples, the condition to be fulfilled discussed above comprises what the specific signaling is.

For example, the condition is fulfilled if the specific signaling is an indication about UE beam change, an indication about serving beam or serving TRP change, a request of transmitting UL reference signal, a feedback of measurement for a UE beam change, a feedback of measurement for a serving beam or serving TRP change, an indication for a UE beam change, an indication for a serving beam or serving TRP change, UL reference signal, and/or a scheduling request.

In a non-limiting example, the UE selects the (specific) UE beam by successfully receiving a common signal from the (specific) UE beam. In various non-limiting examples, the common signal is a synchronization signal, a reference signal, a discovery signal, or a beam specific reference signal. In a non-limiting example, the UE detects the (specific) UE beam in sweeping subframe(s). In a non-limiting example, the UE receives (or monitors) the specific signaling in DL sweeping subframe(s). In a non-limiting example, the UE transmits the specific signaling in UL sweeping subframe(s). In various non-limiting examples, the specific signaling is predefined, configured by the network, requested by the network dynamically or is indicated with scheduling information. In various non-limiting examples, the timing to transmit or receive the specific signal is predefined, configured by the network, requested by the network dynamically or indicated with scheduling information.

In a non-limiting example, the UE doesn't use beam sweeping for user data transmission or user data reception. In various non-limiting examples, the network node is a central unit (CU), a distributed unit (DU), a transmission/ reception point (TRP), a base station (BS) or a 5G node. In a non-limiting example, the UE is capable of using UE beamforming. In a non-limiting example, the UE is in a connected mode.

In a non-limiting example, the UE comprises a control circuit, a processor installed in the control circuit, and a memory installed in the control circuit and coupled to the processor. The processor is configured to execute a program code stored in the memory to perform the method steps as defined in the above discussion including with respect to FIGS. 17 and 18.

Various embodiments of the subject disclosure described herein can be applied to or implemented in exemplary wireless communication systems and devices described below. In addition, various embodiments of the subject disclosure are described mainly in the context of the 3GPP architecture reference model. However, it is understood that with the disclosed information, one skilled in the art could easily adapt for use and implement aspects of the subject disclosure in a 3GPP2 network architecture as well as in other network architectures, as further described herein.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio) wireless access for 5G, or some other modulation techniques.

Figure 19:
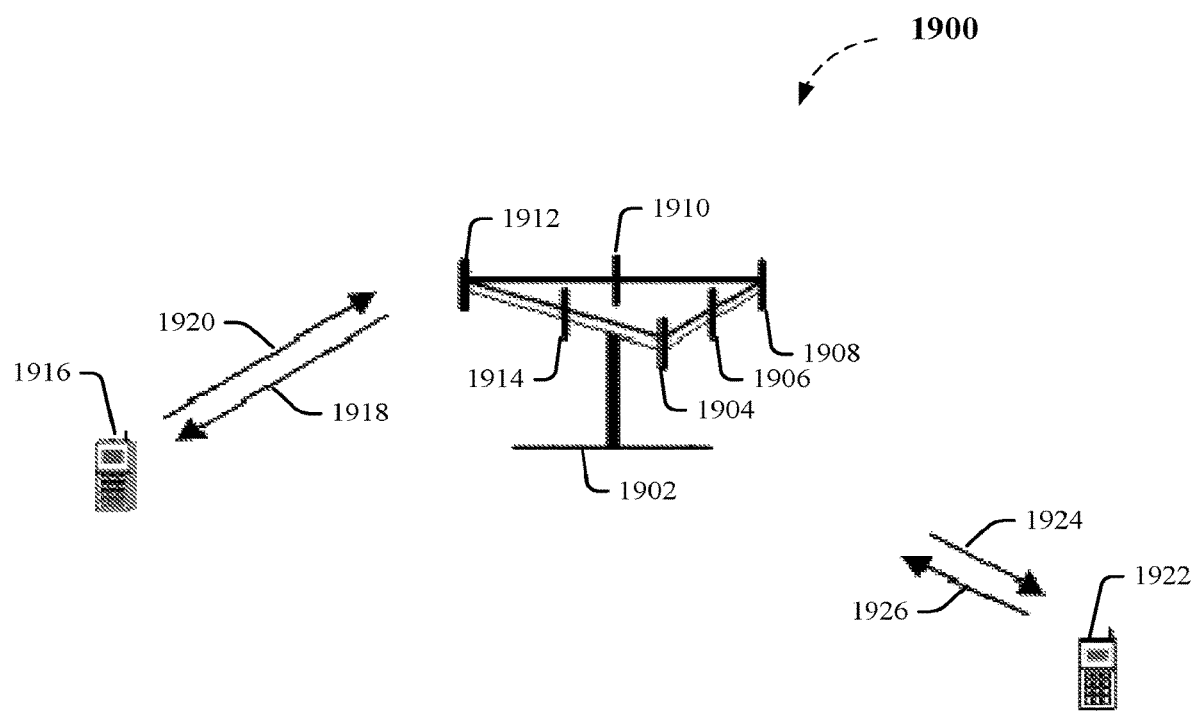
FIG. 19 illustrates and example multiple access wireless communication system in which various embodiments directed to concurrent UL transmissions and concurrent DL transmissions can be implemented.

FIG. 19 is a block diagram representing an exemplary non-limiting multiple access wireless communication system 1900 in which various embodiments described herein can be implemented. An access network 1902 (AN) includes multiple antenna groups, one group including antennas 1904 and 1906, another group including antennas 1908 and 1910, and an additional group including antennas 1912 and 1914. In FIG. 19, only two antennas are shown for each antenna group, however, more or fewer antennas may be utilized for each antenna group. Access terminal 1916 (AT) is in communication with antennas 1912 and 1914, where antennas 1912 and 1914 transmit information to access terminal 1916 over forward link 1918 and receive information from access terminal 1916 over reverse link 1920. Access terminal (AT) 1922 is in communication with antennas 1906 and 1908, where antennas 1906 and 1908 transmit information to access terminal (AT) 1922 over forward link 1924 and receive information from access terminal (AT) 1922 over reverse link 1926. In a Frequency Division Duplex (FDD) system, communication links 1918, 1920, 1924 and 1926 may use different frequency for communication. For example, forward link 1918 may use a different frequency than that used by reverse link 1920.

Each group of antennas and/or the area in which they are designed to communicate is often referred to as a sector of the access network. In non-limiting aspects, antenna groups each can be designed to communicate to access terminals in a sector of the areas covered by access network 1902.

In communication over forward links 1918 and 1924, the transmitting antennas of access network 1902 may utilize beamforming in order to improve the signal-to-noise ratio of forward links for the different access terminals 1916 and 1922. Also, an access network using beamforming to transmit to access terminals scattered randomly through its coverage normally causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), UE device, a communication device, a wireless communication device, a mobile device, a mobile communication device, a terminal, an access terminal or some other terminology.

Figure 20:
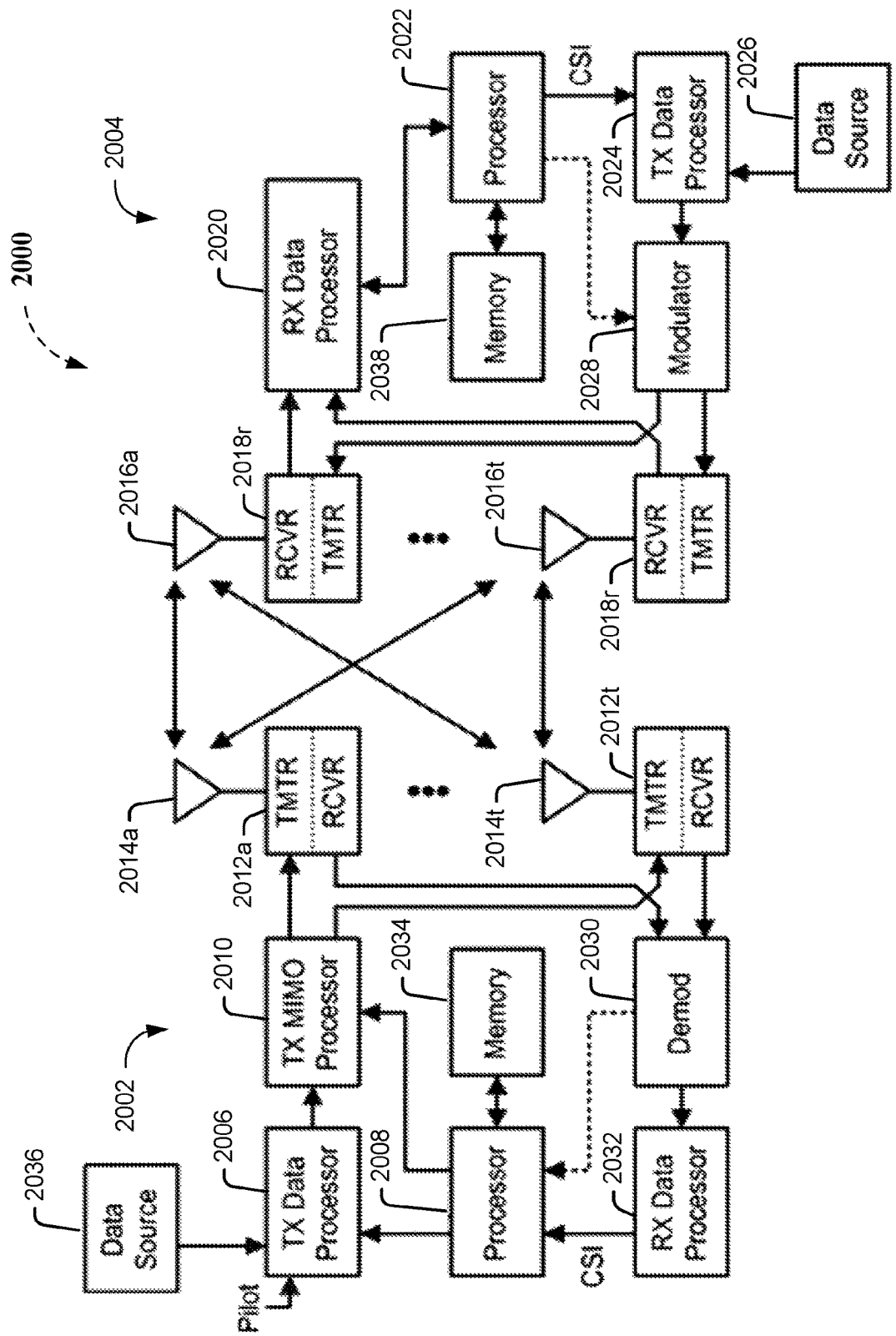
FIG. 20 illustrates a simplified block diagram of an example MIMO system depicting an example embodiment of a transmitter system (also referred to herein as an access network) and a receiver system (also referred to herein as an access terminal (AT) or user equipment (UE)), suitable for incorporation of various aspects directed to various networks, TRPs and UEs described herein.

FIG. 20 is a simplified block diagram of an exemplary non-limiting MIMO system 2000 depicting an exemplary embodiment of a transmitter system 2002 (also referred to herein as the access network) and a receiver system 2004 (also referred to herein as an access terminal (AT) or user equipment (UE)).

In a non-limiting aspect, each data stream can be transmitted over a respective transmit antenna. Exemplary TX data processor 2006 can format, code, and interleave the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system 2004 to estimate the channel response. The multiplexed pilot and coded data for each data stream is then modulated (e.g., symbol mapped) based on a particular modulation scheme (e.g., binary phase-shift keying (BPSK), quadrature phase shift keying (QPSK), M-ary or higher-order PSK (M-PSK), or M-ary quadrature amplitude modulation (M-QAM), etc.) selected for that data stream to provide modulation symbols.

The data rate, coding, and modulation for each data stream may be determined by instructions performed by processor 2008.

The modulation symbols for all data streams are then provided to a TX MIMO processor 2010, which may further process the modulation symbols (e.g., for OFDM). TX MIMO processor 2010 then provides multiple (NT) modulation symbol streams to NT transmitters (TMTR) 2012a through 2012t. In certain embodiments, TX MIMO processor 2010 applies beamforming weights to the symbols of the data streams and to the antenna from which the symbol is being transmitted.

Each transmitter 2012 receives and processes a respective symbol stream to provide one or more analog signals, and further conditions (e.g., amplifies, filters, and upconverts, etc.) the analog signals to provide a modulated signal suitable for transmission over the MIMO channel. NT modulated signals from transmitters 2012a through 2012t are then transmitted from NT antennas 2014a through 2014t, respectively.

At receiver system 2004, the transmitted modulated signals are received by multiple (NR) antennas 2016a through 2016r and the received signal from each antenna 2016 is provided to a respective receiver (RCVR) 2018a through 2018r. Each receiver 2018 conditions (e.g., filters, amplifies, and downconverts, etc.) a respective received signal, digitizes the conditioned signal to provide samples, and further processes the samples to provide a corresponding "received" symbol stream.

A RX data processor 2020 then receives and processes the NR received symbol streams from NR receivers 2018 based on a particular receiver processing technique to provide NT "detected" symbol streams. The RX data processor 2020 then demodulates, deinterleaves, and decodes each detected symbol stream to recover the traffic data for the data stream. The processing by RX data processor 2020 is complementary to that performed by TX MIMO processor 2010 and TX data processor 2006 at transmitter system 2002.

A processor 2022 periodically determines which precoding matrix to use, for example, as further described herein. Processor 2022 formulates a reverse link message comprising a matrix index portion and a rank value portion.

The reverse link message may comprise various types of information regarding the communication link and/or the received data stream. The reverse link message is then processed by a TX data processor 2024, which also receives traffic data for a number of data streams from a data source 2026, modulated by a modulator 2028, conditioned by transmitters 2018a through 2018r, and transmitted back to transmitter system 2002.

At transmitter system 2002, the modulated signals from receiver system 2004 are received by antennas 2014, conditioned by receivers 2012, demodulated by a demodulator 2030, and processed by a RX data processor 2032 to extract the reserve link message transmitted by the receiver system 2004. Processor 2008 then determines which pre-coding matrix to use for determining the beamforming weights then processes the extracted message.

Memory 2034 may be used to temporarily store some buffered/computational data from 2030 or 2032 through Processor 2008, store some buffered data from data source 2036, or store some specific program codes, for example, as further described herein, for example, regarding FIGS. 17-18. Likewise, memory 2038 may be used to temporarily store some buffered/computational data from RX data processor 2020 through processor 2022, store some buffered data from data source 2026, or store some specific program codes, for example, as further described herein, for example, regarding FIGS. 17-18.

In view of the example embodiments described supra, devices and systems that can be implemented in accordance with the disclosed subject matter will be better appreciated with reference to the diagrams of FIGS. 17-18. While for purposes of simplicity of explanation, the example devices and systems are shown and described as a collection of blocks, it is to be understood and appreciated that the claimed subject matter is not limited by the order, arrangement, and/or number of the blocks, as some blocks may occur in different orders, arrangements, and/or combined and/or distributed with other blocks or functionality associated therewith from what is depicted and described herein. Moreover, not all illustrated blocks may be required to implement the example devices and systems described hereinafter. Additionally, it should be further understood that the example devices and systems and/or functionality disclosed hereinafter and throughout this specification are capable of being stored on an article of manufacture to facilitate transporting and transferring such methods to computers, for example, as further described herein. The terms computer readable medium, article of manufacture, and the like, as used herein, are intended to encompass a computer program product accessible from any computer-readable device or media such as a tangible computer readable storage medium.

It can be understood that various techniques described herein may be implemented in connection with hardware or software or, where appropriate, with a combination of both. As used herein, the terms "device," "component," "system" and the like are likewise intended to refer to a computer-related entity, either hardware, a combination of hardware and software, software, or software in execution. For example, a "device," "component," subcomponent, "system" portions thereof, and so on, may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

It can be further understood that while a brief overview of example systems, methods, scenarios, and/or devices has been provided, the disclosed subject matter is not so limited. Thus, it can be further understood that various modifications, alterations, addition, and/or deletions can be made without departing from the scope of the embodiments as described herein. Accordingly, similar non-limiting implementations can be used or modifications and additions can be made to the described embodiments for performing the same or equivalent function of the corresponding embodiments without deviating therefrom.

Figure 21:
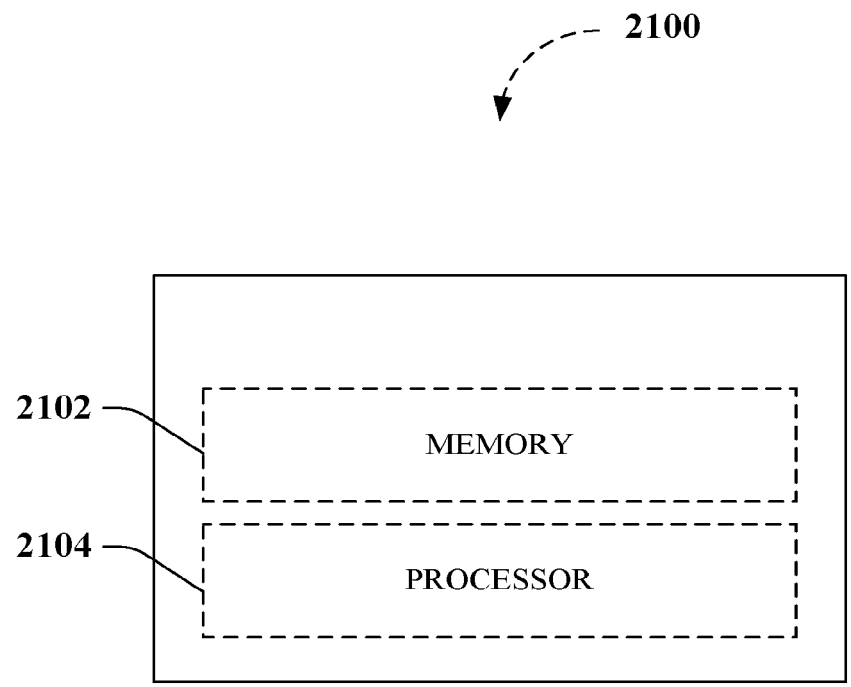
FIG. 21 depicts an example non-limiting device or system suitable for performing various aspects of the disclosed subject matter.

FIG. 21 illustrates an example non-limiting device or system 2100 suitable for performing various aspects of the disclosed subject matter. The device or system 2100 can be a stand-alone device or a portion thereof, a specially programmed computing device or a portion thereof (e.g., a memory retaining instructions for performing the techniques as described herein coupled to a processor), and/or a composite device or system comprising one or more cooperating components distributed among several devices, as further described herein. As an example, example non-limiting device or system 2100 can comprise example of any of the devices and/or systems illustrated in FIGS. 1-20, as described above, or as further described below regarding FIGS. 22-24, for example, or portions thereof.

For example, FIG. 21 depicts an example device 2100, which can be the UE device 1916 or 1922. In another non-limiting example, FIG. 21 depicts an example device 2100, which can be an access network 1902, eNB 110 or a TRP 120, 124 or 128. The device 2100 can be configured to perform the beamforming, beam sweeping, cell selection, cell measurement, cell evaluation and the connection between the UE device and a network, as illustrated in FIGS. 1-18 and related description. The device or system 2100 can comprise a memory 2102 that retains computer-executable instructions on a tangible computer readable storage medium and those instructions can be executed by the processor 2104. By way of the example, the UE 2100 can receive an indication from a network about one or more UE beams to be used for transmission or reception. The UE 2100 can also use the one or more UE beams for transmission or reception. The UE 2100 can also transmit or receive a specific signal using a specific UE beam if a certain condition is fulfilled. The specific UE beam is selected by the UE and is different from the one or more UE beams.

Figure 22:
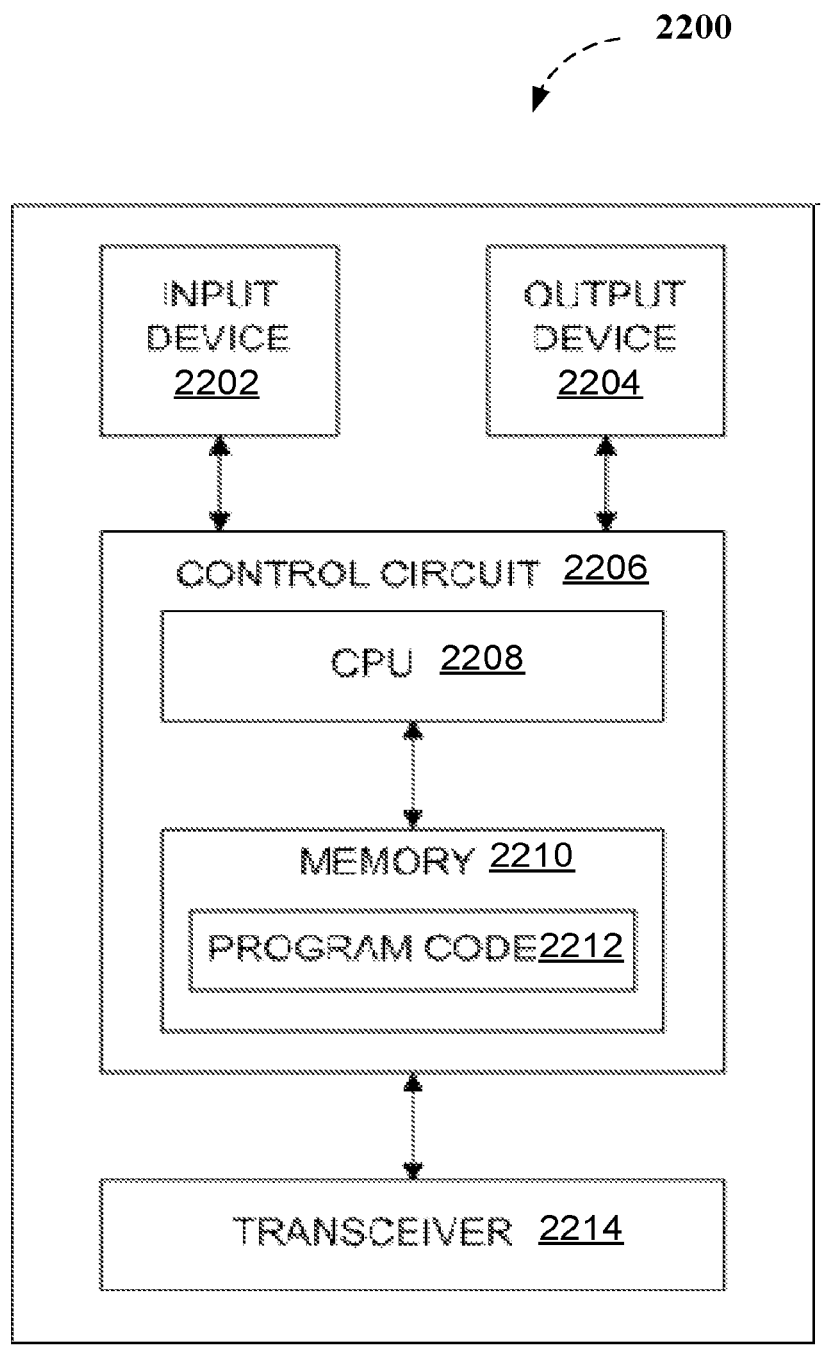
FIG. 22 depicts a simplified functional block diagram of an example non-limiting communication device suitable for incorporation of various aspects of the subject disclosure.

FIG. 22 depicts a simplified functional block diagram of an exemplary non-limiting communication device 2200, such as a UE device (e.g., UE device configured to perform beam management comprising AT 1916, AT 1922, receiver system 2004, or portions thereof, and/or as further described herein regarding FIGS. 10-21, etc.), a base station (e.g., a base station such as an access network 1902, a transmitter system 2002, and/or portions thereof, configured for beam handling, etc.), etc., suitable for incorporation of various aspects of the subject disclosure. As shown in FIG. 22, exemplary communication device 2200 in a wireless communication system can be utilized for realizing the UEs (or ATs) 1916 and 1922 in FIG. 19, for example, and the wireless communications system such as described above regarding FIG. 19, as a further example, can be the LTE system, the NR system, etc. Exemplary communication device 2200 can comprise an input device 2202, an output device 2204, a control circuit 2206, a central processing unit (CPU) 2208, a memory 2210, a program code 2212, and a transceiver 2214. Exemplary control circuit 2206 can execute the program code 2212 in the memory 2210 through the CPU 2208, thereby controlling an operation of the communications device 2200. Exemplary communications device 2200 can receive signals input by a user through the input device 2202, such as a keyboard or keypad, and can output images and sounds through the output device 2204, such as a monitor or speaker. Exemplary transceiver 2214 can be used to receive and transmit wireless signals, delivering received signals to the control circuit 2206, and outputting signals generated by the control circuit 2206 wirelessly, for example, as described above regarding FIG. 19.

Accordingly, further non-limiting embodiments as described herein can comprise a UE device (e.g., UE device configured for beam handling and comprising AT 1916, AT 1922, receiver system 2004, or portions thereof, and/or as further described herein regarding FIGS. 1-24, etc.) that can comprise one or more of a exemplary control circuit 2206, a processor (e.g., CPU 2208, etc.) installed in the control circuit (e.g., control circuit 2206), a memory (e.g., memory 2210) installed in the control circuit (e.g., control circuit 2206) and coupled to the processor (e.g., CPU 2208, etc.), wherein the processor (e.g., CPU 2208, etc.) is configured to execute a program code (e.g., program code 2212) stored in the memory (e.g., memory 2210) to perform method steps and/or provide functionality as described herein. As a non-limiting example, exemplary program code (e.g., program code 2212) can comprise computer-executable instructions as described above regarding FIG. 21, portions thereof, and/or complementary or supplementary instructions thereto, in addition to computer-executable instructions configured to achieve functionalities as described herein, regarding FIGS. 1-24, and/or any combinations thereof.

Figure 23:
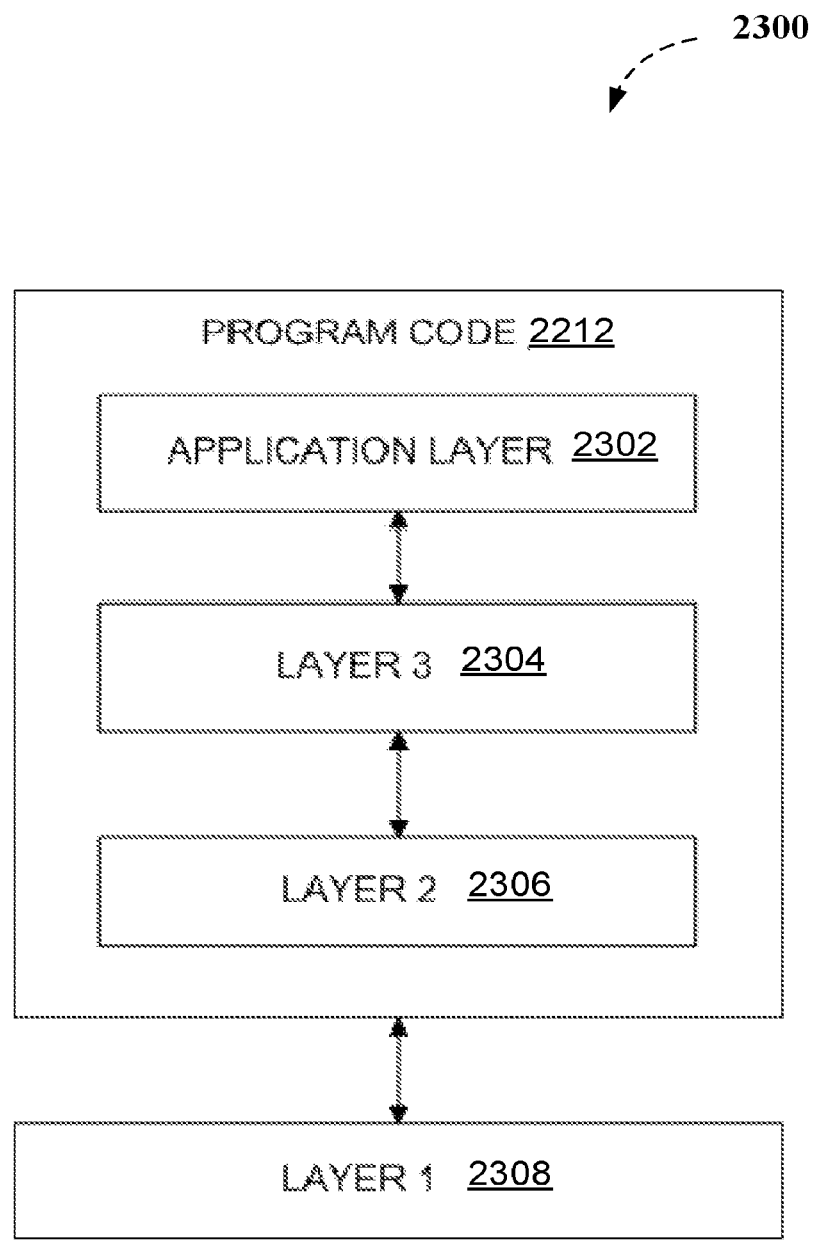
FIG. 23 depicts a simplified block diagram of example program code shown in FIGS. 17-22, suitable for incorporation of various aspects of the subject disclosure.

FIG. 23 depicts a simplified block diagram 2300 of exemplary program code 2212 shown in FIG. 22, suitable for incorporation of various aspects of the subject disclosure. In this embodiment, exemplary program code 2212 can comprise an application layer 2302, a Layer 3 portion 2304, and a Layer 2 portion 2306, and can be coupled to a Layer 1 portion 2308. The Layer 3 portion 2304 generally performs radio resource control. The Layer 2 portion 2306 generally performs link control. The Layer 1 portion 2308 generally performs physical connections. For LTE, LTE-A, or NR system, the Layer 2 portion 2306 may include a Radio Link Control (RLC) layer and a Medium Access Control (MAC) layer. The Layer 3 portion 2304 may include a Radio Resource Control (RRC) layer. In addition, as further described above, exemplary program code (e.g., program code 2212) can comprise computer-executable instructions as described above regarding FIG. 22, portions thereof, and/or complementary or supplementary instructions thereto, in addition to computer-executable instructions configured to achieve functionalities as described herein, regarding FIGS. 1-24, and/or any combinations thereof.

Figure 24:
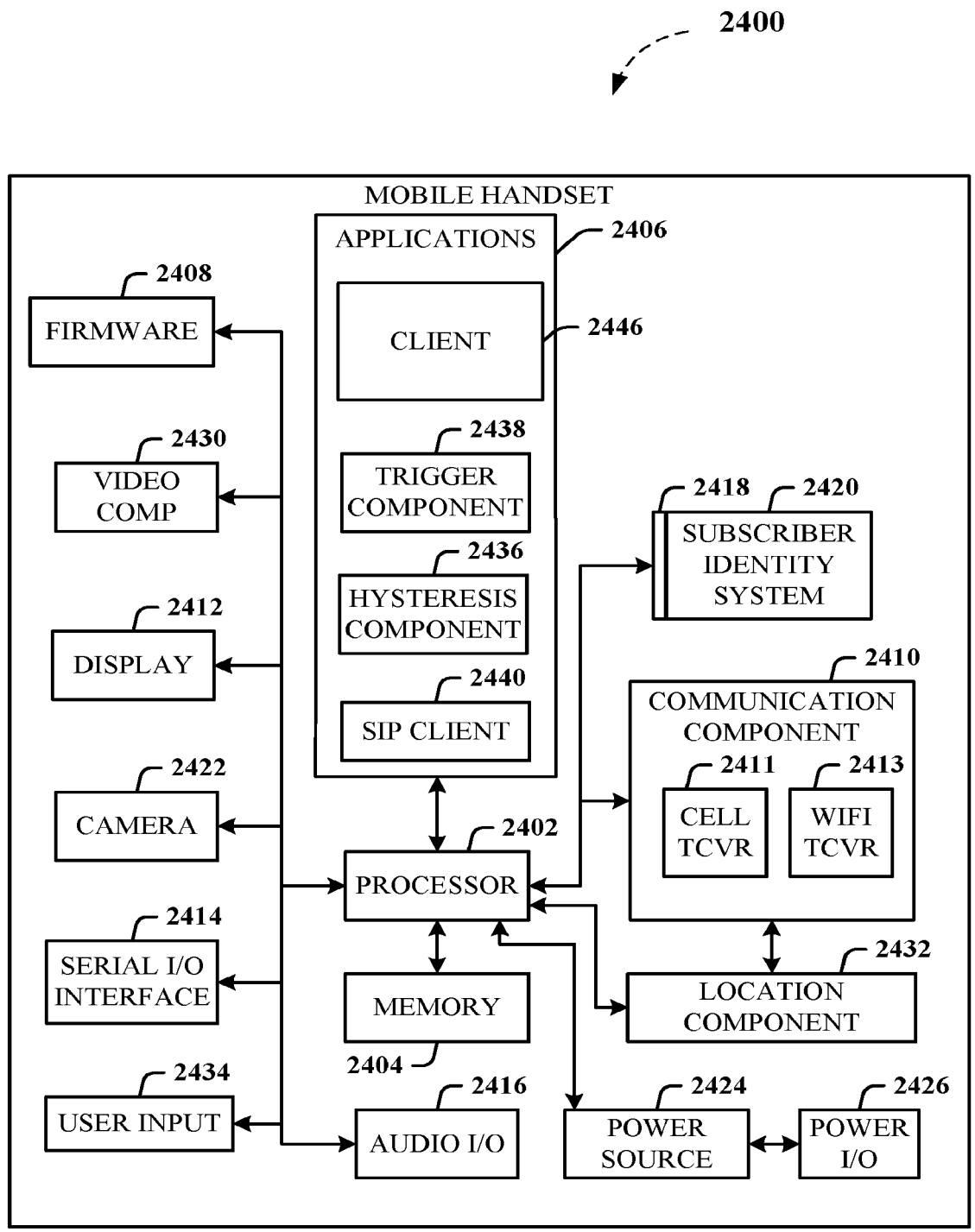
FIG. 24 illustrates a schematic diagram of an example mobile device (e.g. a mobile handset, user device, user equipment, or access terminal) that can facilitate various non-limiting aspects of the disclosed subject matter in accordance with the embodiments described herein.

FIG. 24 depicts a schematic diagram of an example mobile device 2400 (e.g., a mobile handset, UE, AT, etc.) that can facilitate various non-limiting aspects of the disclosed subject matter in accordance with the embodiments described herein. Although mobile handset 2400 is illustrated herein, it will be understood that other devices can be any of a number of other a mobile devices, for instance, and that the mobile handset 2400 is merely illustrated to provide context for the embodiments of the subject matter described herein. The following discussion is intended to provide a brief, general description of an example of a suitable environment 2400 in which the various embodiments can be implemented. While the description includes a general context of computer-executable instructions embodied on a tangible computer readable storage medium, those skilled in the art will recognize that the subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer readable media. Computer readable media can comprise any available media that can be accessed by the computer and includes both volatile and non-volatile media, removable and non-removable media. By way of example and not limitation, computer readable media can comprise tangible computer readable storage and/or communication media. Tangible computer readable storage can include volatile and/or non-volatile media, removable and/or non-removable media implemented in any method or technology for storage of information, such as computer readable instructions, data structures, program modules, or other data. Tangible computer readable storage can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media, as contrasted with tangible computer readable storage, typically embodies computer readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal, for example, as further described herein. By way of example, and not limitation, communication media includes wired media such as a wired network or direct-wired connection, and wireless media such as acoustic, RF, infrared and other wireless media. Combinations of the any of the above should also be included within the scope of computer readable communications media as distinguishable from computer-readable storage media.

The handset 2400 can include a processor 2402 for controlling and processing all onboard operations and functions. A memory 2404 interfaces to the processor 2402 for storage of data and one or more applications 2406 (e.g., communications applications such as browsers, apps, etc.). Other applications can support operation of communications and/or financial communications protocols. The applications 2406 can be stored in the memory 2404 and/or in a firmware 2408, and executed by the processor 2402 from either or both the memory 2404 or/and the firmware 2408. The firmware 2408 can also store startup code for execution in initializing the handset 2400. A communications component 2410 interfaces to the processor 2402 to facilitate wired/wireless communication with external systems, e.g., cellular networks, VoIP networks, and so on. Here, the communications component 2410 can also include a suitable cellular transceiver 2411 (e.g., a GSM transceiver, a CDMA transceiver, an LTE transceiver, etc.) and/or an unlicensed transceiver 2413 (e.g., Wireless Fidelity (WiFi™), Worldwide Interoperability for Microwave Access (WiMax®)) for corresponding signal communications, and the like. The handset 2400 can be a device such as a cellular telephone, a personal digital assistant (PDA) with mobile communications capabilities, and messaging-centric devices. The communications component 2410 also facilitates communications reception from terrestrial radio networks (e.g., broadcast), digital satellite radio networks, and Internet-based radio services networks, and so on.

The handset 2400 includes a display 2412 for displaying text, images, video, telephony functions (e.g., a Caller ID function, etc.), setup functions, and for user input. For example, the display 2412 can also be referred to as a "screen" that can accommodate the presentation of multimedia content (e.g., music metadata, messages, wallpaper, graphics, etc.). The display 2412 can also display videos and can facilitate the generation, editing and sharing of video quotes. A serial I/O interface 2414 is provided in communication with the processor 2402 to facilitate wired and/or wireless serial communications (e.g., Universal Serial Bus (USB), and/or Institute of Electrical and Electronics Engineers (IEEE) 1494) through a hardwire connection, and other serial input devices (e.g., a keyboard, keypad, and mouse). This supports updating and troubleshooting the handset 2400, for example. Audio capabilities are provided with an audio I/O component 2416, which can include a speaker for the output of audio signals related to, for example, indication that the user pressed the proper key or key combination to initiate the user feedback signal. The audio I/O component 2416 also facilitates the input of audio signals through a microphone to record data and/or telephony voice data, and for inputting voice signals for telephone conversations.

The handset 2400 can include a slot interface 2418 for accommodating a SIC (Subscriber Identity Component) in the form factor of a card Subscriber Identity Module (SIM) or universal SIM 2420, and interfacing the SIM card 2420 with the processor 2402. However, it is to be appreciated that the SIM card 2420 can be manufactured into the handset 2400, and updated by downloading data and software.

The handset 2400 can process Internet Protocol (IP) data traffic through the communication component 2410 to accommodate IP traffic from an IP network such as, for example, the Internet, a corporate intranet, a home network, a person area network, a cellular network, etc., through an internet service provider (ISP) or broadband cable provider. Thus, VoIP traffic can be utilized by the handset 2400 and IP-based multimedia content can be received in either an encoded or a decoded format.

A video processing component 2422 (e.g., a camera and/or associated hardware, software, etc.) can be provided for decoding encoded multimedia content. The video processing component 2422 can aid in facilitating the generation and/or sharing of video. The handset 2400 also includes a power source 2424 in the form of batteries and/or an alternating current (AC) power subsystem, which power source 2424 can interface to an external power system or charging equipment (not shown) by a power input/output (I/O) component 2426.

The handset 2400 can also include a video component 2430 for processing video content received and, for recording and transmitting video content. For example, the video component 2430 can facilitate the generation, editing and sharing of video. A location-tracking component 2432 facilitates geographically locating the handset 2400. A user input component 2434 facilitates the user inputting data and/or making selections as previously described. The user input component 2434 can also facilitate selecting perspective recipients for fund transfer, entering amounts requested to be transferred, indicating account restrictions and/or limitations, as well as composing messages and other user input tasks as required by the context. The user input component 2434 can include such conventional input device technologies such as a keypad, keyboard, mouse, stylus pen, and/or touch screen, for example.

Referring again to the applications 2406, a hysteresis component 2436 facilitates the analysis and processing of hysteresis data, which is utilized to determine when to associate with an access point. A software trigger component 2438 can be provided that facilitates triggering of the hysteresis component 2436 when a WiFi™ transceiver 1813 detects the beacon of the access point. A Session Initiation Protocol (SIP) client 2440 enables the handset 2400 to support SIP protocols and register the subscriber with the SIP registrar server. The applications 2406 can also include a communications application or client 2446 that, among other possibilities, can facilitate user interface component functionality as described above.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code or program code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the various embodiments of the subject disclosure have been described in connection with various non-limiting aspects, it will be understood that the embodiments of the subject disclosure may be capable of further modifications. This application is intended to cover any variations, uses or adaptation of the subject disclosure following, in general, the principles of the subject disclosure, and including such departures from the present disclosure as come within the known and customary practice within the art to which the subject disclosure pertains.

Those skilled in the art will recognize that it is common within the art to describe devices and/or processes in the fashion set forth herein, and thereafter use engineering practices to integrate such described devices and/or processes into systems. That is, at least a portion of the devices and/or processes described herein can be integrated into a system via a reasonable amount of experimentation. Those having skill in the art will recognize that a typical system can include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control device (e.g., feedback for sensing position and/or velocity; control devices for moving and/or adjusting parameters). A typical system can be implemented utilizing any suitable commercially available components, such as those typically found in data computing/communication and/or network computing/communication systems.

Various embodiments of the disclosed subject matter sometimes illustrate different components contained within, or connected with, other components. It is to be understood that such depicted architectures are merely exemplary, and that, in fact, many other architectures can be implemented which achieve the same and/or equivalent functionality. In a conceptual sense, any arrangement of components to achieve the same and/or equivalent functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," "operably coupled," "communicatively connected," and/or "communicatively coupled," to each other to achieve the desired functionality, and any two components capable of being so associated can also be viewed as being "operably couplable" or "communicatively couplable" to each other to achieve the desired functionality. Specific examples of operably couplable or communicatively couplable can include, but are not limited to, physically mateable and/or physically interacting components, wirelessly interactable and/or wirelessly interacting components, and/or logically interacting and/or logically interactable components.

With respect to substantially any plural and/or singular terms used herein, those having skill in the art can translate from the plural to the singular and/or from the singular to the plural as can be appropriate to the context and/or application. The various singular/plural permutations may be expressly set forth herein for the sake of clarity, without limitation.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes, but is not limited to," etc.). It will be further understood by those skilled in the art that, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limit any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those skilled in the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub-ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be noted that various embodiments of the disclosed subject matter have been described herein for purposes of illustration, and that various modifications may be made without departing from the scope and spirit of the subject disclosure. Accordingly, the various embodiments disclosed herein are not intended to be limiting, with the true scope and spirit being indicated by the appended claims.

In addition, the words "example" and "non-limiting" are used herein to mean serving as an example, instance, or illustration. For the avoidance of doubt, the subject matter disclosed herein is not limited by such examples. Moreover, any aspect or design described herein as "an example," "an illustration," "example" and/or "non-limiting" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements, as described above.

As mentioned, the various techniques described herein can be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on computer and the computer can be a component. In addition, one or more components can reside within a process and/or thread of execution and a component can be localized on one computer and/or distributed between two or more computers.

Systems described herein can be described with respect to interaction between several components. It can be understood that such systems and components can include those components or specified sub-components, some of the specified components or sub-components, or portions thereof, and/or additional components, and various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and that any one or more middle component layers, such as a management layer, can be provided to communicatively couple to such sub-components in order to provide integrated functionality, as mentioned. Any components described herein can also interact with one or more other components not specifically described herein but generally known by those of skill in the art.

As mentioned, in view of the example systems described herein, methods that can be implemented in accordance with the described subject matter can be better appreciated with reference to the flowcharts of the various figures and vice versa. While for purposes of simplicity of explanation, the methods can be shown and described as a series of blocks, it is to be understood and appreciated that the claimed subject matter is not limited by the order of the blocks, as some blocks can occur in different orders and/or concurrently with other blocks from what is depicted and described herein. Where non-sequential, or branched, flow is illustrated via flowchart, it can be understood that various other branches, flow paths, and orders of the blocks, can be implemented which achieve the same or a similar result. Moreover, not all illustrated blocks can be required to implement the methods described hereinafter.

While the disclosed subject matter has been described in connection with the disclosed embodiments and the various figures, it is to be understood that other similar embodiments may be used or modifications and additions may be made to the described embodiments for performing the same function of the disclosed subject matter without deviating therefrom. Still further, multiple processing chips or multiple devices can share the performance of one or more functions described herein, and similarly, storage can be effected across a plurality of devices. In other instances, variations of process parameters (e.g., configuration, number of components, aggregation of components, process step timing and order, addition and/or deletion of process steps, addition of preprocessing and/or post-processing steps, etc.) can be made to further optimize the provided structures, devices and methods, as shown and described herein. In any event, the systems, structures and/or devices, as well as the associated methods described herein have many applications in various aspects of the disclosed subject matter, and so on. Accordingly, the subject disclosure should not be limited to any single embodiment, but rather should be construed in breadth, spirit and scope in accordance with the appended claims.

What is claimed is:

1. A method for a user equipment (UE), comprising:
receiving a first indication from a network node about at least one UE beam to be used for a transmission or a reception in a physical downlink control channel (PDCCH);
receiving a periodic signaling from the network node associated with detection of a change of a serving beam for beam tracking;
using the at least one UE beam for the transmission or the reception at a first time; and
responsive to the UE detecting failure of the beam tracking based on the periodic signaling at a second time:
selecting, by the UE, a second UE beam, wherein the second UE beam is different than the at least one UE beam; and
transmitting a second indication about the change of the serving beam using the second UE beam, wherein the transmitting the second indication using the second UE beam responsive to the UE detecting failure of the beam tracking based on the periodic signaling at the second time is performed without UE beam sweeping.

2. The method of claim 1, wherein the transmitting the second indication is performed responsive to (i) the UE detecting failure of the beam tracking based on the periodic signaling at the second time is performed and (ii) determining that the at least one UE beam and the serving beam are misaligned.

3. The method of claim 1, wherein the beam tracking is used to track and change the serving beam.

4. The method of claim 1, wherein the UE maintains information about the at least one UE beam to be used for the transmission or the reception based on the beam tracking.

5. The method of claim 1, wherein the UE receives the first indication together with scheduling information for the transmission or the reception.

6. The method of claim 1, wherein timing associated with transmitting the second indication is configured by the network node.

7. The method of claim 1, wherein the first indication implicitly indicates that the at least one UE beam to be used for the transmission or the reception is the at least one UE beam receiving scheduling information for the transmission or the reception.

8. The method of claim 1, wherein the selecting the second UE beam responsive to the UE detecting failure of the beam tracking based on the periodic signaling at the second time is performed responsive to successfully receiving a common signal from the second UE beam.

9. The method of claim 8, wherein the common signal includes a synchronization signal or a reference signal.

10. A user equipment (UE), comprising:
a control circuit;
a processor installed in the control circuit; and
a memory installed in the control circuit and operatively coupled to the processor, wherein the processor is configured to execute a program code stored in the memory to perform operations comprising:
receiving a first indication from a network node about at least one UE beam to be used for a transmission or a reception in a physical downlink control channel (PDCCH);
receiving a periodic signaling from the network node associated with detection of a change of a serving beam for beam tracking;
using the at least one UE beam for the transmission or the reception at a first time; and
responsive to the UE detecting failure of the beam tracking based on the periodic signaling at a second time:
selecting, by the UE, a second UE beam, wherein the second UE beam is different than the at least one UE beam; and
transmitting a second indication about the change of the serving beam using the second UE beam, wherein the transmitting the second indication using the second UE beam responsive to the UE detecting failure of the beam tracking based on the periodic signaling at the second time is performed without UE beam sweeping.

11. The UE claim 10, wherein the transmitting the second indication is performed responsive to (i) the UE detecting failure of the beam tracking based on the periodic signaling at the second time is performed and (ii) determining that the at least one UE beam and the serving beam are misaligned.

12. The UE of claim 10, wherein the beam tracking is used to track and change the serving beam.

13. The UE of claim 10, wherein the UE maintains information about the at least one UE beam to be used for the transmission or the reception based on the beam tracking.

14. The UE of claim 10, wherein the UE receives the first indication together with scheduling information for the transmission or the reception.

15. The UE of claim 10, wherein timing associated with transmitting the second indication is configured by the network node.

16. The UE of claim 10, wherein the first indication implicitly indicates that the at least one UE beam to be used for the transmission or the reception is the at least one UE beam receiving scheduling information for the transmission or the reception.

17. The UE of claim 10, wherein the selecting the second UE beam responsive to the UE detecting failure of the beam tracking based on the periodic signaling at the second time is performed responsive to successfully receiving a common signal from the second UE beam.

18. The UE of claim 17, wherein the common signal includes a synchronization signal or a reference signal.

* * * * *